US012658825B2

(12) United States Patent
Moheimani et al.

(10) Patent No.: US 12,658,825 B2
(45) Date of Patent: Jun. 16, 2026

(54) MEMS NANOPOSITIONER AND METHOD OF FABRICATION

(71) Applicant: Board of Regents, The University of Texas System, Austin, TX (US)

(72) Inventors: Seyed Omid Reza Moheimani, Allen, TX (US); Afshin Alipour, Richardson, TX (US); Mustafa Bulut Coskun, Pasadena, CA (US)

(73) Assignee: Board of Regents, The University of Texas System, Austin, TX (US)

( * ) Notice: Subject to any disclaimer, the term of this patent is extended or adjusted under 35 U.S.C. 154(b) by 257 days.

(21) Appl. No.: 18/633,690

(22) Filed: Apr. 12, 2024

(65) Prior Publication Data

US 2024/0283378 A1      Aug. 22, 2024

Related U.S. Application Data

(62) Division of application No. 17/645,229, filed on Dec. 20, 2021, now Pat. No. 11,973,441.

(60) Provisional application No. 63/127,763, filed on Dec. 18, 2020.

(51) Int. Cl.
*G01Q 70/16* (2010.01)
*G01Q 60/16* (2010.01)
*H02N 1/00* (2006.01)

(52) U.S. Cl.
CPC ............. *H02N 1/006* (2013.01); *G01Q 60/16* (2013.01)

(58) Field of Classification Search
CPC ........ G01Q 70/16; G01Q 60/16; G01Q 70/08; H02N 1/006; B82Y 40/00
See application file for complete search history.

(56) References Cited

U.S. PATENT DOCUMENTS

| | | | |
|---|---|---|---|
| 5,235,187 A | 8/1993 | Arney et al. | |
| 6,136,208 A * | 10/2000 | Chou | G01Q 70/16 |
| | | | 216/2 |
| 6,277,666 B1 | 8/2001 | Hays et al. | |
| 6,690,178 B2 | 2/2004 | Harris et al. | |
| 6,803,755 B2 | 10/2004 | Herbert et al. | |
| 7,391,707 B2 | 6/2008 | Culver et al. | |
| 7,482,826 B2 | 1/2009 | Albrecht et al. | |
| 7,637,960 B2 * | 12/2009 | Cai | G01Q 60/38 |
| | | | 977/863 |
| 8,397,555 B1 * | 3/2013 | Chand | B82Y 35/00 |
| | | | 216/2 |

(Continued)

OTHER PUBLICATIONS

M. Mita et al. "Bulk Micromachined Tunneling Tips Integrated with Positioning Actuators" Journal of Micro.Mech.Sys. V.14, No. 1, pp. 23-28. (Year: 2005).*

(Continued)

*Primary Examiner* — Burton S Mullins
(74) *Attorney, Agent, or Firm* — Yee & Associates, P.C.

(57) ABSTRACT

A microelectromechanical (MEMS) device is provided. The MEMS device comprises a substrate and a movable structure flexurally connected to the substrate, capable of moving in relation to the substrate, wherein the movable structure further comprising two or more segments having at least one mechanical connection between said segments to provide structural integrity of the moving structure; and wherein the at least one mechanical connection electrically isolates at least two segments.

17 Claims, 16 Drawing Sheets

(56) References Cited

U.S. PATENT DOCUMENTS

| | | | |
|---|---|---|---|
| 9,535,086 B2 * | 1/2017 | Beyeler | .................. G01Q 20/00 |
| 10,527,645 B2 | 1/2020 | Walter et al. | |

OTHER PUBLICATIONS

A. Alipour, M. B. Coskun and S. O. R. Moheimani, "A MEMS Nanopositioner With Integrated Tip for Scanning Tunneling Micros-copy," in Journal of Microelectromechanical Systems, vol. 30, No. 2, pp. 271-280, Apr. 2021 (Year: 2021).*

A. Alipour et al. "A high bandwidth microelectromechanical system-based nanopositioner for scanning tunneling microscopy", Rev. Sci. Instrum. Jul. 1, 2019; 90 (7): 073706. https://doi.org/10.1063/1.5109900 (Year: 2019).

M. Maroufi et al. "MEMS for Nanopositioning: Design and Appli-cations," Journal of Microelectromechanical Systems, vol. 26, No. 3, pp. 469-500, Jun. 2017, doi: 10.1109/JMEMS.2017.2687861. (Year: 2017).

Notice of Allowance, dated Dec. 28, 2023, regarding U.S. Appl. No. 17/645,229, 7 pages.

Office Action, dated Sep. 13, 2023, regarding U.S. Appl. No. 17/645,229, 16 pages.

* cited by examiner

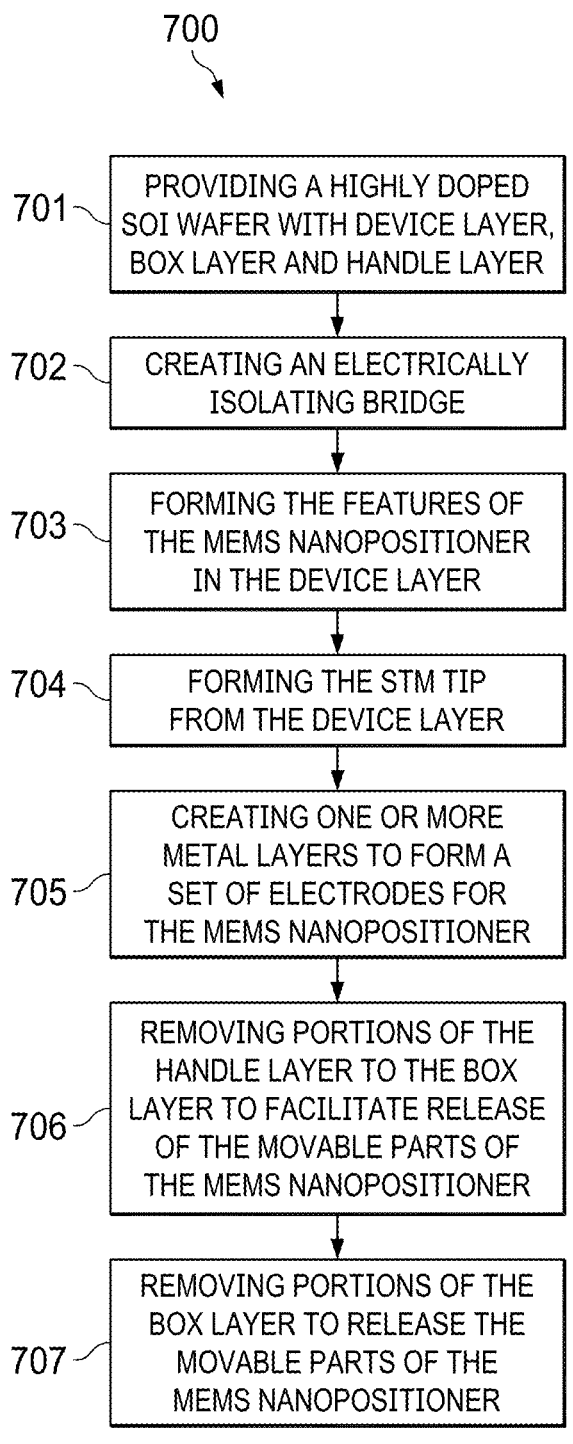

700

701 — PROVIDING A HIGHLY DOPED SOI WAFER WITH DEVICE LAYER, BOX LAYER AND HANDLE LAYER

702 — CREATING AN ELECTRICALLY ISOLATING BRIDGE

703 — FORMING THE FEATURES OF THE MEMS NANOPOSITIONER IN THE DEVICE LAYER

704 — FORMING THE STM TIP FROM THE DEVICE LAYER

705 — CREATING ONE OR MORE METAL LAYERS TO FORM A SET OF ELECTRODES FOR THE MEMS NANOPOSITIONER

706 — REMOVING PORTIONS OF THE HANDLE LAYER TO THE BOX LAYER TO FACILITATE RELEASE OF THE MOVABLE PARTS OF THE MEMS NANOPOSITIONER

707 — REMOVING PORTIONS OF THE BOX LAYER TO RELEASE THE MOVABLE PARTS OF THE MEMS NANOPOSITIONER

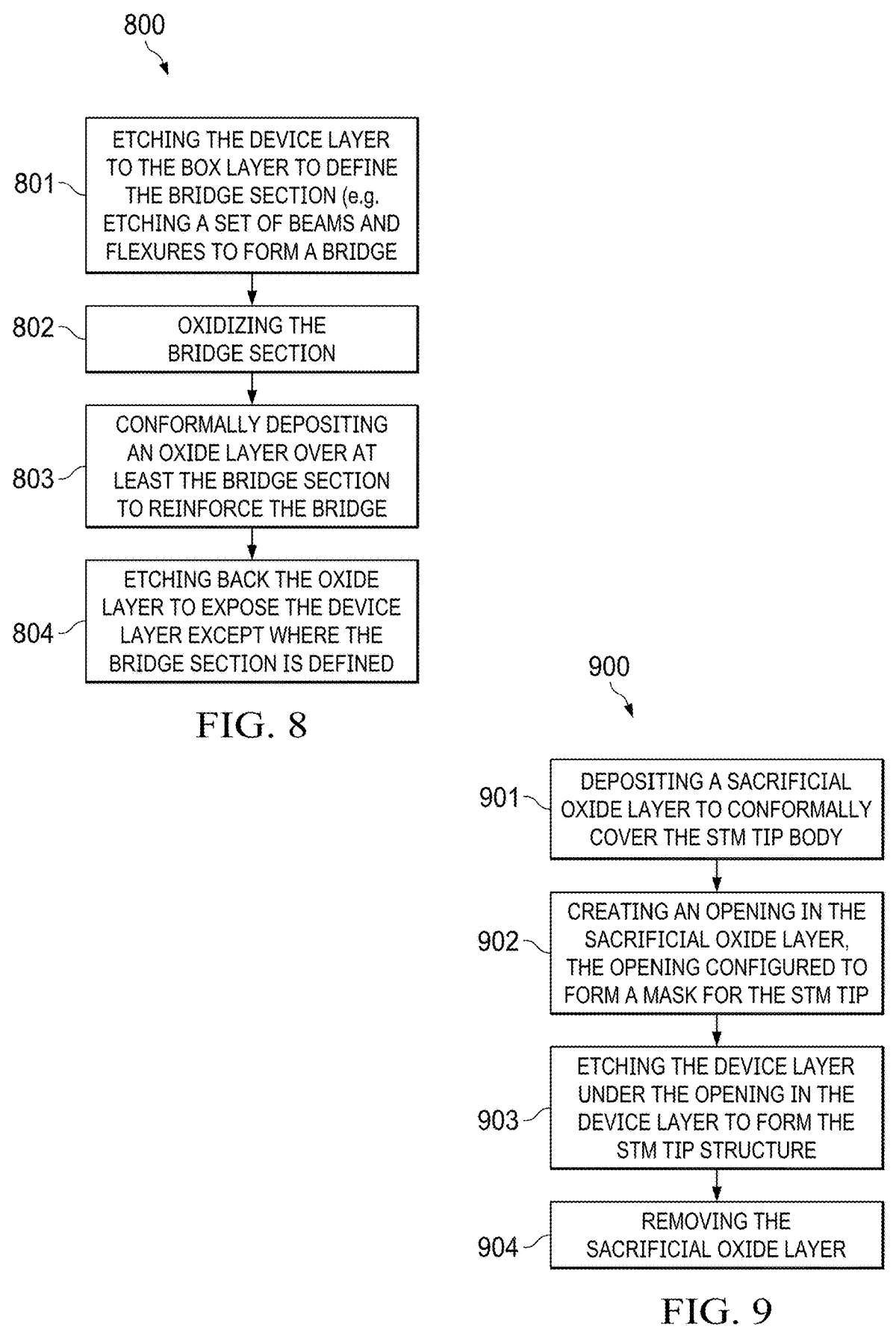

801 — ETCHING THE DEVICE LAYER TO THE BOX LAYER TO DEFINE THE BRIDGE SECTION (e.g. ETCHING A SET OF BEAMS AND FLEXURES TO FORM A BRIDGE

802 — OXIDIZING THE BRIDGE SECTION

803 — CONFORMALLY DEPOSITING AN OXIDE LAYER OVER AT LEAST THE BRIDGE SECTION TO REINFORCE THE BRIDGE

804 — ETCHING BACK THE OXIDE LAYER TO EXPOSE THE DEVICE LAYER EXCEPT WHERE THE BRIDGE SECTION IS DEFINED

901 — DEPOSITING A SACRIFICIAL OXIDE LAYER TO CONFORMALLY COVER THE STM TIP BODY

902 — CREATING AN OPENING IN THE SACRIFICIAL OXIDE LAYER, THE OPENING CONFIGURED TO FORM A MASK FOR THE STM TIP

903 — ETCHING THE DEVICE LAYER UNDER THE OPENING IN THE DEVICE LAYER TO FORM THE STM TIP STRUCTURE

904 — REMOVING THE SACRIFICIAL OXIDE LAYER

FIG. 9

MEMS NANOPOSITIONER AND METHOD OF FABRICATION

RELATED APPLICATIONS

This application is a Divisional of U.S. patent application Ser. No. 17/645,229, filed Dec. 20, 2021, which claims priority to U.S. Provisional Application 63/127,763, filed Dec. 18, 2020, the entirety of which are hereby incorporated by reference in their entirely.

STATEMENT OF GOVERNMENT INTEREST

This invention was made with government support under Grant No. DE-EE0008322 awarded by the Department of Energy. The government has certain rights in the invention.

BACKGROUND INFORMATION

1. Field

This invention relates to a MEMS positioning device for positioning a scanning tip in scanning tunneling microscopy. It further relates to batch fabrication of MEMS devices having electrical isolation between components.

2. Background

The Scanning Tunneling Microscope (STM) is one of the most powerful and versatile tools in nanotechnology. The STM is commonly employed to obtain topographic images from a conductive surface at atomic levels, as well as to perform nanolithography, where a monolayer resist on a surface is patterned with atomic resolution. Thanks to its ultra-high resolution and atomic precision, the STM has found use in single atom adsorption/desorption and manipulation applications. All these features have contributed to the STM being recognized as a leading tool for fabrication of fascinating atomic-scale electronic devices. For example, STM may be used for fabrication of atomic wires, atomic-scale memories, atomic switches, atomic diodes, single molecule amplifiers, single atom transistors, and solid-state quantum computers. Besides nanofabrication, the STM has been widely used for studying various characteristics of matter at the atomic scale.

The working principle of STM relies on the electron tunneling from a nanometer-sharp tip to a conductive surface. An STM tip is usually mounted directly on a three Degree-of-Freedom (DOF) piezotube nanopositioner to position the tip close to the sample surface, e.g., about a nanometer or less. By applying an appropriate voltage bias between the tip and sample, electrons start tunnelling through the tip-sample gap. The tunneling current value is exponentially proportional to the tip-sample distance, thus the atomic topography of the sample causes the tunneling current to vary during a scan. Commonly, a control feedback loop is incorporated to maintain the tunneling current at a setpoint by keeping the tip-sample distance constant and regulating the Z-axis of the piezotube. STM images are constructed by plotting the controller output along the reference trajectories in the XY plane. The combination of the bias voltage, tunneling current setpoint, and electron dose values determines the STM mode for either imaging or lithography.

SUMMARY

An illustrative embodiment provides a microelectromechanical (MEMS) device comprising a substrate and a movable structure flexurally connected to the substrate, capable of moving in relation to the substrate, wherein the movable structure further comprising two or more segments having at least one mechanical connection between said segments to provide structural integrity of the moving structure; and wherein the at least one mechanical connection electrically isolates at least two segments.

Another illustrative embodiment provides a MEMS nanopositioner for scanning tunneling microscopy. The nanopositioner comprises: a substrate having a flat surface defining a substrate plane, a first electrode, a second electrode, and a set of substrate actuator fixtures; shuttle beam movable in a Z-direction, wherein the Z-direction is parallel to the substrate plane and aligned with a longitudinal axis of the shuttle beam, the shuttle beam further comprising: a tip segment comprising a STM tip electrically connected to the first electrode for sensing tunneling current; an actuation segment mechanically connected to the tip segment by a bridge segment; wherein the bridge segment provides electrical isolation between the tip segment and the actuation segment; wherein the actuation and tip segments are flexibly connected to the substrate by a set of flexures; and wherein the actuation segment further comprises a set of electrostatic actuator arms interposed with the set of substrate actuator fixtures wherein the set of actuator arms are electrically connected to the second electrode for applying a voltage between the set of actuator arms and the set of substrate actuator fixtures.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 7 is a flowchart of an overall fabrication process for a MEMS nanopositioner according to an illustrative embodiment;

FIG. 8 is a flowchart of a fabrication process for an electrically isolating bridge segment of a MEMS nanopositioner according to an illustrative embodiment;

FIG. 9 is a flowchart of a fabrication process for a silicon STM tip for a MEMS nanopositioner according to an illustrative embodiment;

DETAILED DESCRIPTION

Figure 1A:
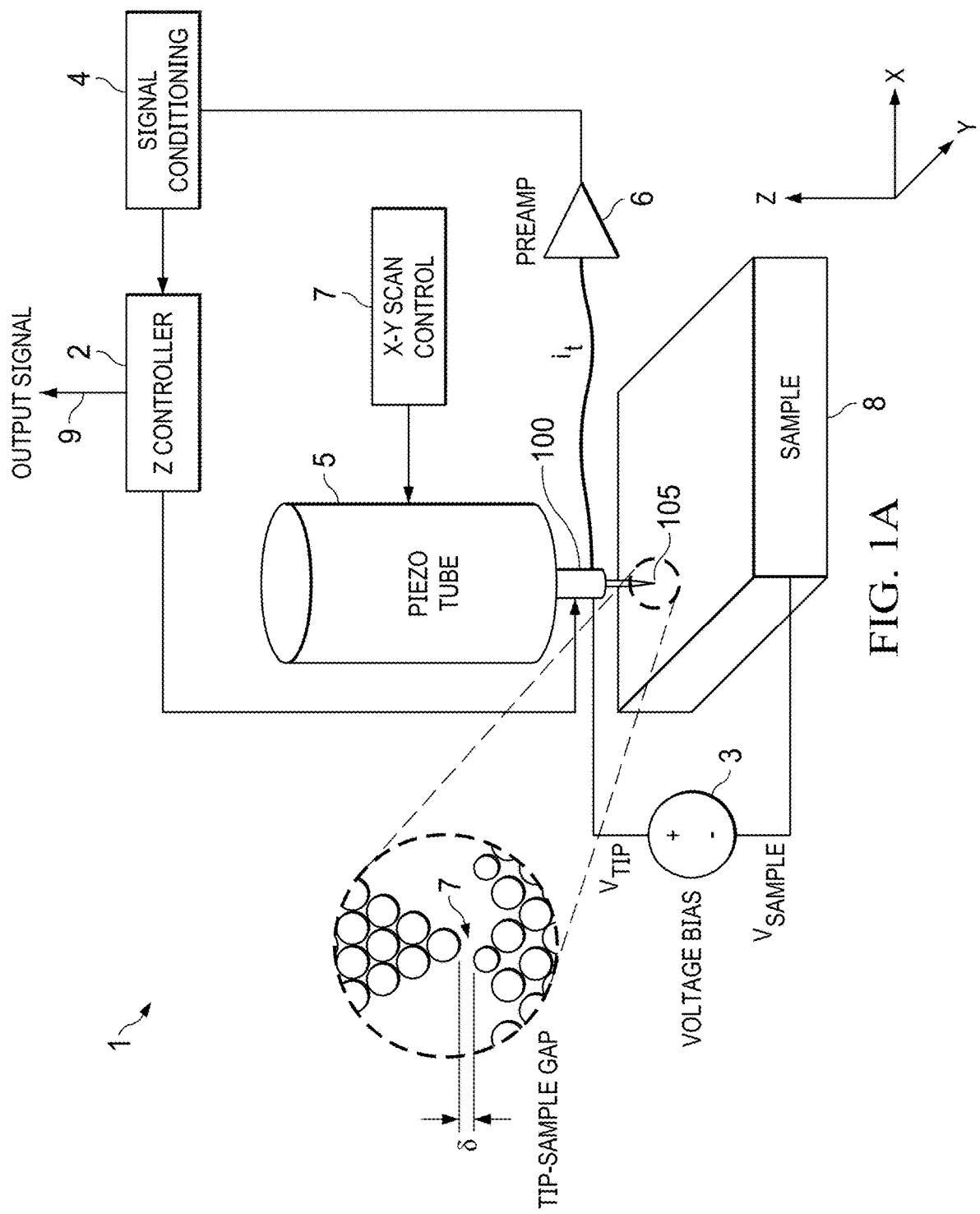
FIG. 1A is a schematic diagram of a scanning tunneling microscope (STM) incorporating a MEMS nanopositioner device in accordance with an illustrative embodiment.

The illustrative embodiments relate to a novel integrated tip for use in a scanning tunneling microscope (STM) and method of fabrication for the integrated tip. Slow Z-axis dynamics of STM systems is a key contributing factor to the traditionally slow scan speed of this instrument. A great majority of STM systems use piezotube nanopositioners for scanning. The piezotube bulkiness along with the mass of STM tip assembly restrict the overall Z-axis bandwidth of the system to about 1 kHz. This limited bandwidth slows down the STM response to the sample topography changes. Herein, we disclose a microfabrication process to build a Microelectromechanical-System (MEMS) nanopositioner for Z-axis positioning in STM with a tenfold bandwidth improvement, and with a similar range of motion as existing STM systems.

The MEMS nanopositioner device features an integrated nanometer-sharp in-plane Si tip, compatible with conventional batch fabrication processes. In addition, a novel electrical isolation technique is provided to electrically isolate the tip from the rest of the MEMS nanopositioner device. This enables a separate routing for tunneling current signal, enabling, for example, parallel STM tips fabricated from a single substrate. The fabricated MEMS nanopositioner device achieves 1.6 µm motion with its first in-plane resonance beyond 10 kHz. The capability of this MEMS nanopositioner to replace the Z-axis component of STMs is demonstrated through obtaining STM images and conducting STM-based lithography on a H-passivated Si(100)–2×1 sample under ultrahigh-vacuum condition.

It is noted here that traditional piezoelectric actuators of STMs lose more than 50% of their actuation capability in cryogenic conditions. The novel MEMS nanopositioner devices described in the present disclosure are highly suitable for low-temperature STM as they maintain their full range of motion in cryogenic conditions.

Despite its critical role in a variety of applications, conventional STM systems are not able to meet the requirements of the emerging applications in nanotechnology. STM is a fundamentally slow system, and its scan speed and throughput are limited for several reasons, like limited bandwidth of the piezotubes in the XY plane, underdamped dynamics of the piezotubes, and limited bandwidth of the current sensors. Another important limiting factor is the bandwidth of the piezotubes for Z-axis positioning, which determines how fast the piezotube can respond to changes in the sample topography during a scan. Since the piezotubes are bulky components, their Z-axis bandwidth is typically limited to about 1 kHz with the tip assembly loaded.

To address the bandwidth limitation issue, researchers have proposed flexure-guided and dual-stage piezo nanopositioners. However, these technologies are yet to find their way into scanning tunneling microscopy. This is mainly due to their bulkiness and difficulties with their utilization in high-throughput nanofabrication applications. In an attempt to fix issues arising from bulkiness and high throughput utilization, flexure-guided nanopositioners have been miniaturized through microfabrication processes. These devices offer large lateral bandwidths, a small footprint, and the potential for use in array configurations. Despite such benefits, most of these devices suffer from slow Z-axis dynamics, ultimately limiting the scan speed.

Disclosed is a 1-DOF Microelectromechanical-Systems (MEMS) nanopositioner device to replace the Z-axis of conventional STM piezo-nanopositioners. The design goal set for the MEMS nanopositioner device was to increase the Z-axis bandwidth of the STM system up to 10 kHz, while maintaining a Range of Motion (ROM) of approximately 2 µm. First, we take advantage of anisotropic wet etching of doped Si to realize a sharp in-plane tip, which is suitable for batch production. This method avoids the need for a post-fabrication process to deposit a Pt tip through Focus Ion Beam (FIB) deposition, which could be tedious, incompatible with batch fabrication processes, and requires skilled oversight. Moreover, we develop a novel electrical isolation technique using standard cleanroom tools to realize a moving shuttle beam comprised of segments that are electrically isolated, but mechanically connected. This allows us to separate the electrical routing for the tip and shuttle actuation within the device layer of a Silicon-on-Insulator (SOI) wafer, in contrast to a double-SOI wafer approach demonstrated in previous work.

Figure 1B:
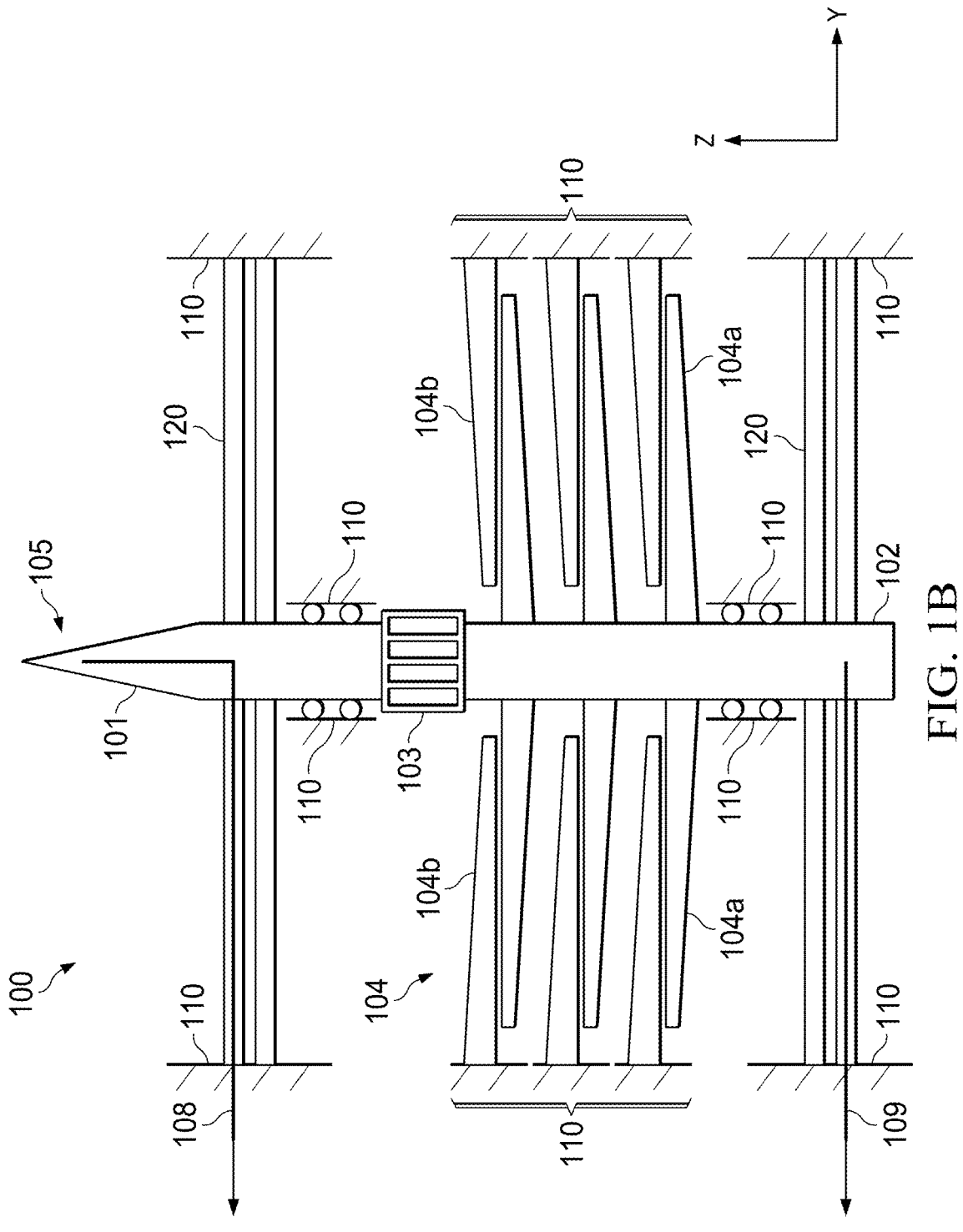
FIG. 1B is a schematic diagram of a MEMS nanopositioner device in accordance with an illustrative embodiment.

A schematic overview of an STM system and a MEMS nanpositioner device in accordance with an embodiment of the invention is illustrated in FIGS. 1A and 1B, respectively.

Referring to FIG. 1A, a scanning tunneling microscope (STM) system 1 comprises an adjustable mount for controlling XY position 7 to which a piezotube positioner 5 is held above a sample surface 8 (where the sample surface is in the XY plane shown). STM system 1 further comprises a Z-controller 2 connected to the piezotube positioner 5 and a MEMS nanopositioner 100. A STM tip 105, extending from MEMS nanopositioner 100 along the Z-axis, is positioned close to the sample surface at a tip-sample height δ of about a nanometer or less. By applying an appropriate voltage bias 3 between the tip and sample, electrons tunnel through the tip-sample gap 7. The tunneling current is exponentially proportional to the tip-sample gap δ, thus the atomic topography of the sample causes the tunneling current to vary during a scan. The tunneling current is amplified by preamp 6 and conditioned by signal conditioning electronics 4 to form an appropriate feedback signal in a control feedback loop. The control feedback loop maintains the tunneling current at a setpoint by keeping the tip-sample gap constant. The tip-sample gap is controlled by regulating the MEMS nanopositioner. STM images are constructed by plotting a controller output signal 9 along the reference trajectories in the XY plane. According to an embodiment of the present invention, the controller output signal is the voltage applied to the MEMS nanopositioner to maintain the tunneling current at the level specified by the setpoint. The combination of the bias voltage, tunneling current setpoint, and electron dose values determines the STM mode for either imaging or lithography.

Figure 1C:
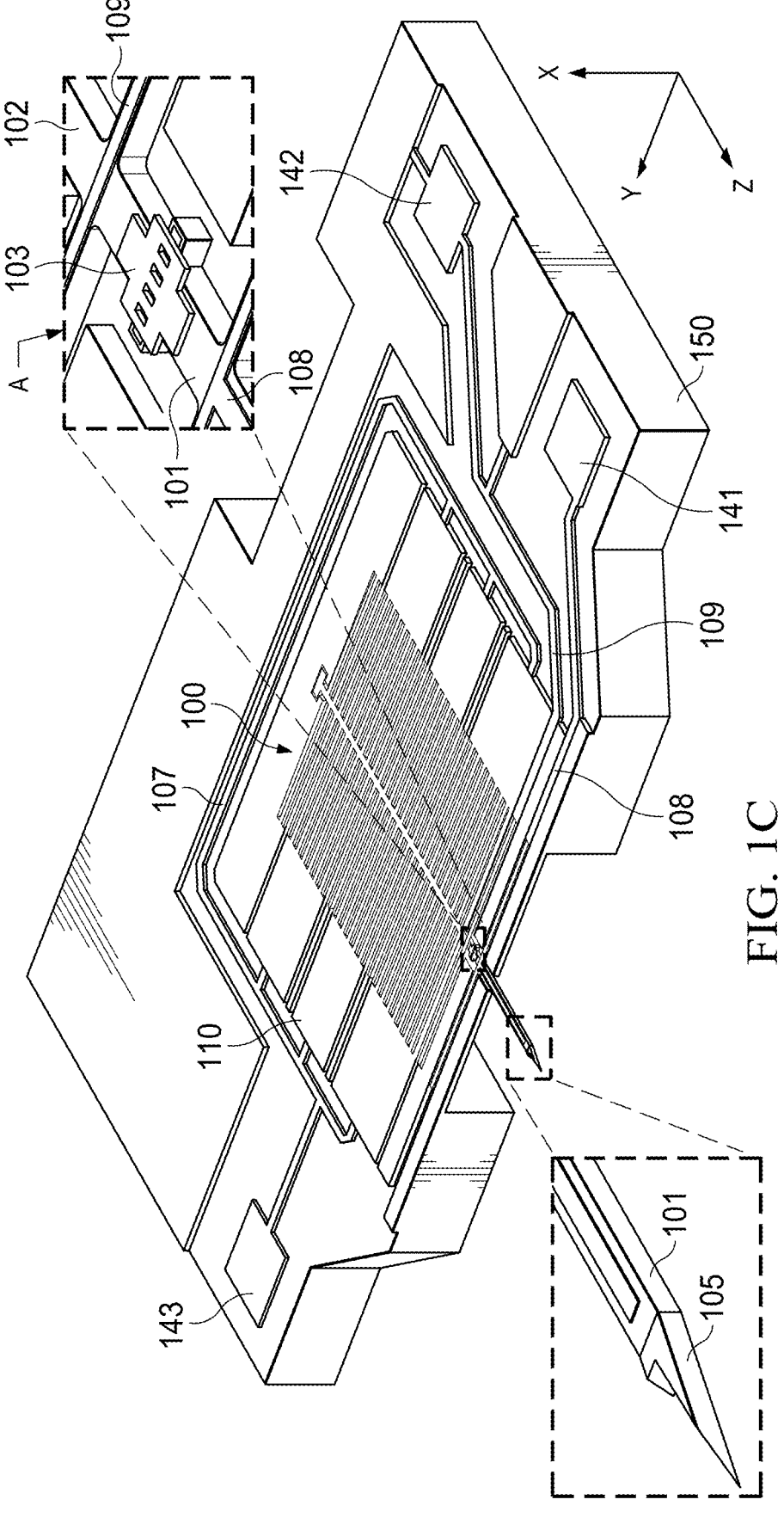
FIG. 1C is a perspective view of a MEMS nanopositioner device in relation to a substrate in accordance with an illustrative embodiment.

Referring to FIG. 1B, a schematic diagram of MEMS nanopositioner device 100 is shown and in FIG. 1C, a perspective view of MEMS nanopositioner device 100 built on substrate 150 is shown. Device 100 includes a structure which is movable primarily in one direction with respect to a fixed island 110. Fixed island 110 is an unreleased portion of the device layer of substrate 150 from which device 100 is fabricated. Device 100 comprises a tip segment 101 mechanically connected to a shuttle beam 102 which is movably suspended by a set of compliant flexures 120 attached to fixed island 110. An in-plane STM tip 105 is fabricated at the end of tip segment 101 from which the MEMS nanopositioner approaches the sample surface. An oxide bridge 103 is implemented between tip segment 101 and shuttle beam 102, which electrically isolates tip segment 101 from the rest of the MEMS nanopositioner. MEMS nanopositioner device 100 further includes electrostatic actuators 104 to accomplish movement of the shuttle beam and tip segment in the Z direction. Electrostatic actuators 104 comprise a set of actuator arms 104*a* attached to the shuttle beam and an opposing set of fixed arms 104*b* attached to the fixed island 110. High stiffness of the flexures along Y direction, restricts the beam from moving in the Y direction. The out-of-plane stiffness of the device along X direction is designed to be higher than the in-plane stiffness along the Z direction to reduce mechanical vibrations. The actuators are also oriented towards Z direction.

Figure 4:
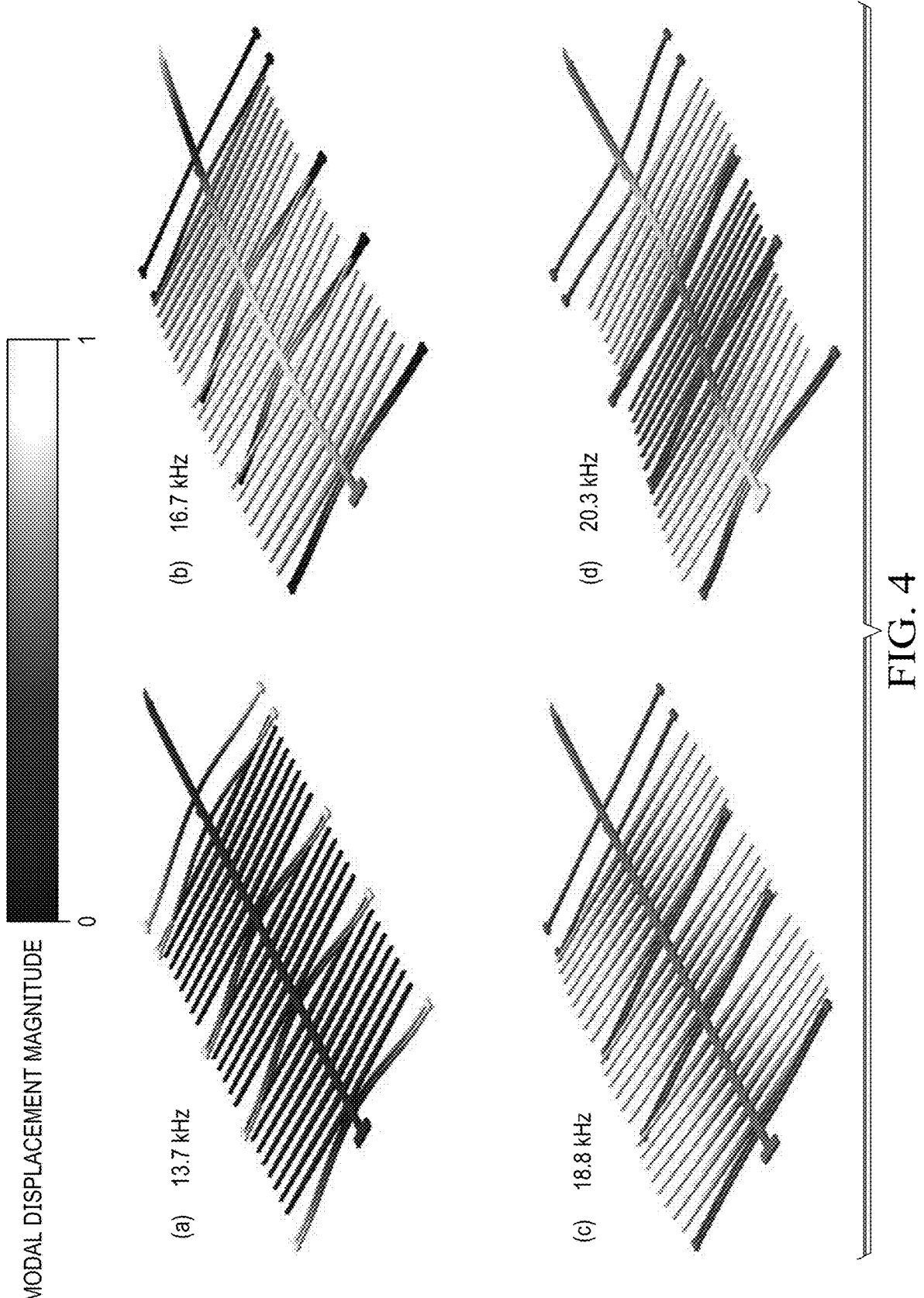
FIG. 4 is a diagram of a simulated resonance mode shapes for a first mode of a MEMS nanopositioner device in accordance with an illustrative embodiment.

According to FIGS. 1B and 1C, electrical signal routing of MEMS nanopositioner device 100 includes an electrical path 108 between STM tip 105 and tip electrode 141 through tip segment 101 (see also inset A). Electrical signal routing also includes electrical path 109 from device electrode 142 to actuator arms 104*a* via shuttle beam 102 (see inset A of FIG. 4 wherein electrical path 109 routes over the topmost flexures attached to shuttle beam 102 to reach device electrode 142. Electrical path 109 is isolated from electrical path 108 via oxide bridge 103. Fixed island 110 is electrically isolated from electrical paths 108 and 109 and connected to actuator electrode 143 via electrical path 107. In some embodiments, the shuttle beam and the actuator arm 104*a* are held at ground potential (via device electrode 142), and a variable actuation voltage is applied to actuator arm 104*b* and fixed island 110 (via actuator electrode 143). Other major aspects of the device are described in detail in the following subsections.

We ultimately aim to integrate the device into a commercial STM by replacing the STM tip with the MEMS nanopositioner device. Therefore, the MEMS nanopositioner device may be constructed to fit the area that the STM system permits with a range-of-motion similar to Z axis of a traditional STM piezotube (which is typically about 2 μm). In a commercial STM of interest to us, the tip is mounted on a tip holder, made up of a gold plate with outer diameter of 6 mm. This tip holder assembly is subsequently placed on a piezotube for tip positioning. In addition, the carrier on which the tip holder is transferred into Ultra-High-Vacuum (UHV) STM chamber, fits traditional STM tips. In some embodiments the traditional STM tips have less than 4.5 mm height. To meet such requirements, non-limiting embodiments are conceived and have been tested as described herein, wherein the MEMS nanopositioner device is constructed to be less than 6 mm wide in Y direction and less than 4.5 mm long in Z direction with a range-of-motion of about 2 μm.

A conductive tip is a critical component of any STM setup, since it enables direct interaction with the surface and is responsible for the electron tunneling. Therefore, the tip fabrication is of great importance given that the tip is required to successfully perform imaging and lithography operations with the proposed device. Previously, a post-processing method of fabrication was used based on Focused Ion Beam (FIB) deposition, to implement an STM tip on the microfabricated device. While sharp functional tips may be obtained with this method, its serial manner of fabrication substantially prolongs the device fabrication process.

Figure 2:
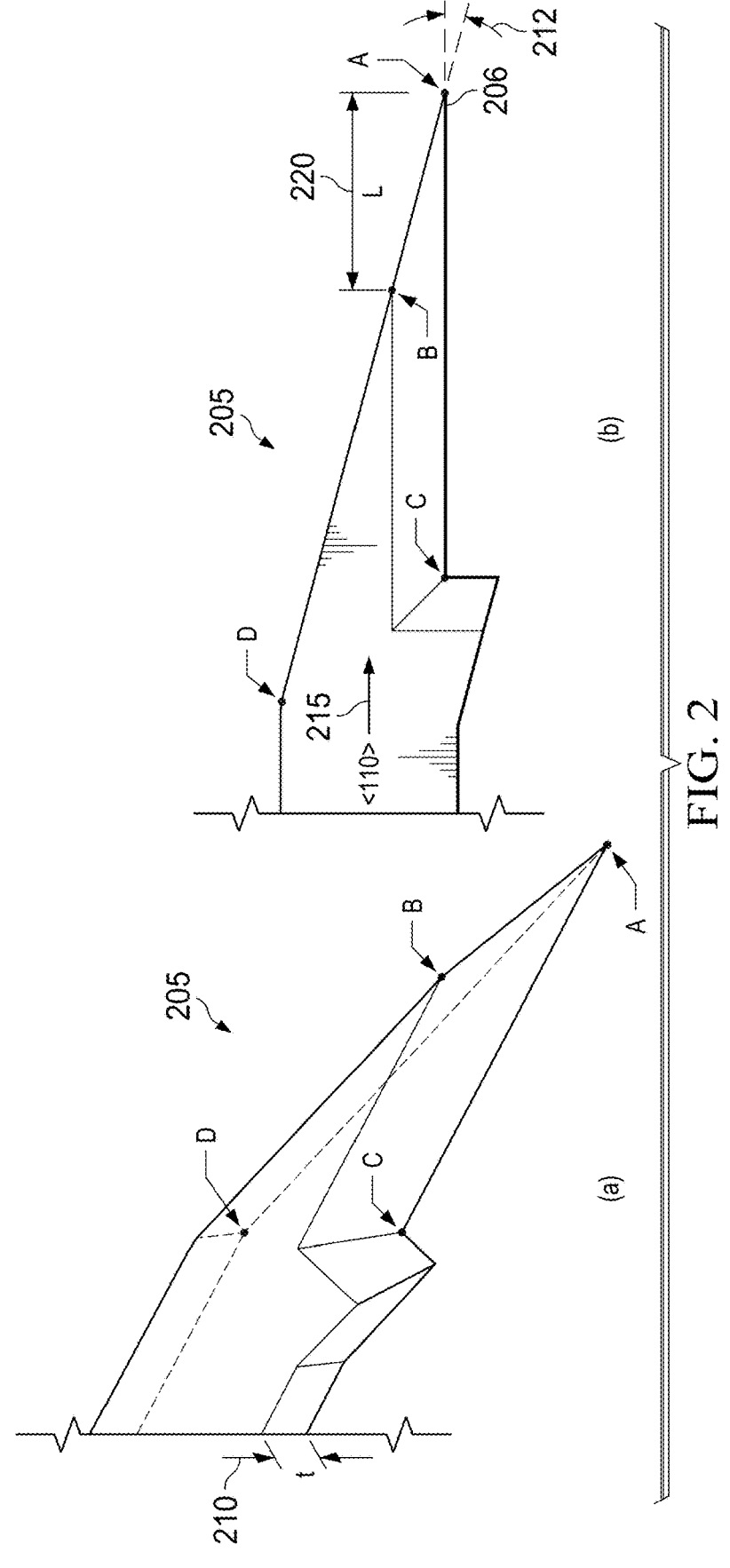
FIG. 2 is a schematic diagram of a silicon STM tip in accordance with an illustrative embodiment.

STM tip fabrication is integrated with a MEMS batch fabrication process for the MEMS nanopositioner by taking advantage of anisotropic wet etching of highly doped Si. FIG. 2 shows schematics of the in-plane STM tip 205. A Silicon-on-Insulator (SOI) wafer with crystallographic <100> orientation is utilized to fabricate this tip. In this scheme, intersection of three planes forms a tip 206 at point A: plane ABC is formed by wet etching of Si, plane ABD is formed by vertical dry etching of Si, and plane ACD is the bottom side of the SOI wafer's device layer. Since the tip is made of Si, its conductivity depends on the doping level of the wafer. The geometry of the tip can be adjusted by two parameters: t (210) and θ. The parameter t is the device layer thickness, and θ is the angle at which the tip body deviates from the Si crystallographic <110> direction 215, defined by photolithography process. The tip apex length, L 220, can be calculated as:

$$L = \frac{t}{\sqrt{2}\tan\theta} \tag{1}$$

The angle of tip on the three aforementioned planes solely depends on θ: arctan (√3 tan θ), arctan (√2 sin θ), and θ, respectively. The length and angles are important characteristics of this tip, but their effects on the tip geometry are opposing. As the tip angles become narrower, which is more favorable for scanning tunneling microscopy, the tip becomes longer. Longer tips are more susceptible to vibrations, deteriorating the STM performance. Therefore, a trade-off is made while selecting θ and t. In this work, we consider θ=15 degrees and t=19 μm. The disclosed tip fabrication method makes the overall microfabrication process conducive to mass production and allows us to obtain tips with an average radius less than 10 nm throughout the wafer.

In the MEMS implementation of the Z-axis STM nanopositioner, both the tip and the electrostatic actuators are parts of the shuttle beam. In some embodiments, an array configuration of MEMS nanopositioners and integrated STM tips are conceived. In order to enable the use of this device in an array configuration, it is necessary to isolate the electrical routings of the tip from the shuttle. To realize this, in a previous design, the top and bottom device layers of a double-SOI wafer were utilized to route out the tunneling current from the tip separate from the ground line going to the shuttle beam. Herein, the in-plane tip scheme requires the electrical isolation to be implemented in the same device layer as the tip and shuttle beam. Therefore, the tip and the shuttle beam are electrically isolated while remaining mechanically attached. To do this, a novel method is disclosed to fabricate a composite shuttle beam consisting of two Si bodies connected to each other by means of an oxide bridge. The isolation method relies on the consumption of Si during wet thermal oxidation, and replacing the conductive slender Si beams bridging the shuttle sections with an insulator, SiO2.

Figure 3:
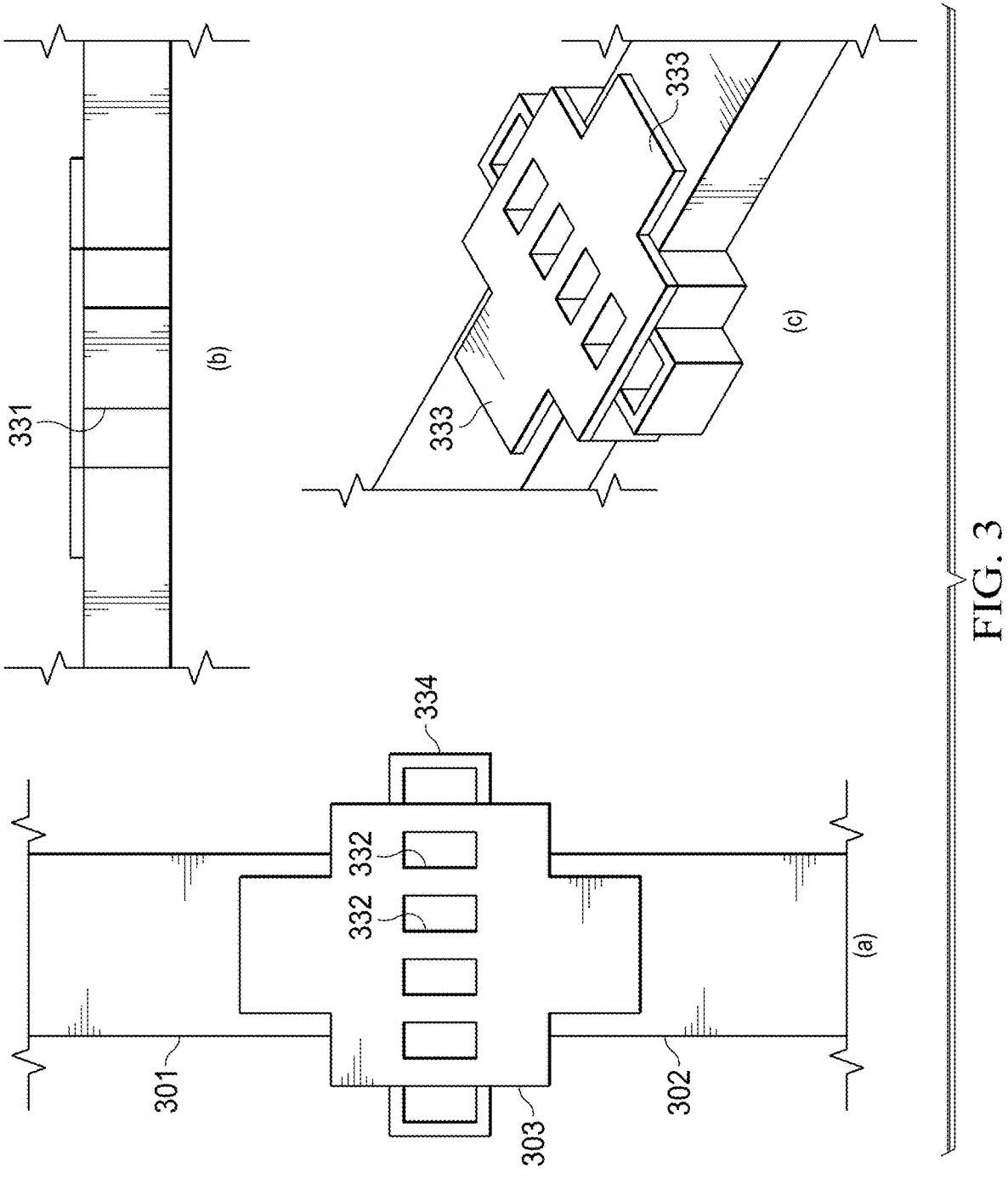
FIG. 3 is a schematic diagram of an oxide bridge in accordance with an illustrative embodiment.

Referring now to FIG. 3, details of an oxide bridge are shown. Shuttle beam 302 is mechanically connected to tip segment 301 via oxide bridge 303. Oxide bridge 303 comprises a set of oxide beams 332 in the middle, a pair of oxide flexures 334 on either side with additional oxide patches 333 on top of the shuttle beam 302 and tip segment 301 for mechanical reinforcement of the oxide/Si interfaces 331. An embodiment of a bridge fabrication process is described below in relation to FIG. 8.

In general, implementation of this scheme on the shuttle beam requires optimizing the mechanical integrity of the beams to prevent the failure of the oxide bridge under force. Since the oxide is brittle material, flexures are put at both sides of the bridge structure, and actuators are implemented unidirectionally to ensure that the bridge region will be under compressive stress all the time. In addition, a preload compressing stress applied on the bridge when the tip is on the sample surface ensures that the inertia of the tip will not cause tensile stress in the bridge region during high-speed applications. The authors believe this is the first demonstration of a movable shuttle beam composed of two electrically separated sections capable of withstanding load and structural integrity.

Electrostatic parallel-plate actuation methodology is implemented in this device, as this transduction mechanism offers high resolution, fast response, and low creep over a few micrometers of range. The electrostatic force and input voltage (neglecting the fringing field effect) are related according to:

$$F_{es} = \frac{\varepsilon A V^2}{2(d_0 - z)^2} = -k_z z, \tag{2}$$

where $F_{es}$, $\varepsilon$, A, V, $d_0$, $k_z$, and z are the electrostatic force, permittivity of the medium, total overlapping plate area, input voltage applied to the plates, initial gap, stiffness in Z direction, and displacement, respectively. Of consideration is the effect of pull-in instability, which occurs when z is larger than one-third of $d_0$. To protect the device, the maximum value of z (stroke of the device) and $d_0$ are limited to 2 mm and 7 mm, respectively. As a secondary precaution, a mechanical stopper is also implemented at the back-end of the shuttle beam to mechanically restrict large displacements.

The dynamic mode of a MEMS nanopositioner can be modeled as a second order spring-mass-damper system, where the cumulative stiffness of the suspension elements has a critical role both in device performance and functionality. Stiffness of the device along the Z-axis has to be sufficiently high to achieve bandwidth greater than 10 kHz, and to be less susceptible to thermal noise and to avoid the snap-in effect arising from the intermolecular forces between the tip and sample during a scan. In addition, the device needs to be compliant enough to reach the desired stroke (i.e. 2 μm) with a reasonable level of actuation voltage (i.e. less than 100V in a STM system).

Considering the aforementioned design criteria, a conservative estimate for the minimum required stiffness along the Z-axis was calculated as 112 $Nm^{-1}$ in previous work. Furthermore, thermal noise is a limiting factor for high-precision scanning probe microscopy, since it can excite mechanical resonances of the device. Due to the fact that MEMS devices are typically lightly damped, thermally excited resonances can deteriorate a system's performance. Based on the equipartition theorem, the thermal noise effect can be characterized by the following equation for a typical oscillator:

$$\bar{x}_{th} = \sqrt{\frac{k_b T}{k}}, \tag{3}$$

Where $\bar{x}_{th}$ is the mean displacement induced by the thermal noise, $k_b$ is the Boltzmann constant, T is temperature, and k is the stiffness along the desired direction. According to this equation, increasing the stiffness reduces thermally-induced vibrations. However, increased stiffness in Z direction leads to the requirement for a larger actuation force. Consequently, larger actuators become more prone to deflection, increasing the chance of electrical shorting. To address the requisite compromise, geometry of the double-clamped beam-type suspension elements are optimized through the Finite Element Analysis (FEA) simulations. In these simulations, the in-plane stiffness value along Z direction is designed to be as high as 285 $Nm^{-1}$, while the out-of-plane stiffness of the device along the X direction is obtained as 505 $Nm^{-1}$. For illustrative purposes, the stiffness of the flexures is estimated to be 622 kN/m along the Y axis. In other embodiments, the stiffnesses may vary somewhat from the example presented, but would typically be of a similar order.

The MEMS nanopositioner device is designed with CoventorWare software. Based on the design parameters discussed in the previous subsections, we built a Computer Aided Design (CAD) model of the device shown in the perspective view of FIG. 1C. The overall dimensions of the device are 4.3 mm in length and 6 mm in width. The nanopositioning device is 19 μm-thick and comprises a 2.7 mm long shuttle beam with an in-plane tip, 16 slender flexures, and 44 pairs of parallel-plate electrostatic actuators. Table 1 summarizes the dimensions of the device components.

TABLE 1

| Feature type | Length (μm) | Width (μm) | Small base (μm) | Large base (μm) |
|---|---|---|---|---|
| Flexures | 750 | 12 | — | — |
| Flexures with routing | 750 | 16 | — | — |
| Actuator arm | 730 | — | 10 | 30 |
| Shuttle beam | 2753 | 40 | — | — |
| Tip | 153 | — | — | — |

Since the nanopositioner is a distributed parameter system, its dynamic response is described by its natural frequencies and mode shapes. Hence, the modes shapes of the device are obtained using the FEA package, and shown in FIG. 4, which are diagrams of simulated resonance mode shapes for (4(*a*)) first mode, (4(*b*)) second mode, (4(*c*)) third mode and (4(*d*)) forth mode of a MEMS nanopositioner device wherein the corresponding mode resonances are at 13.7 kHz, 16.7 kHz, 18.8 kHz and 20.3 kHz, respectively. This demonstrates that the first natural frequency of the device is 13.7 kHz along the Z-axis, satisfying a key design criterion, while the remaining out-of-plane modes lie beyond 16 kHz.

Figure 5:
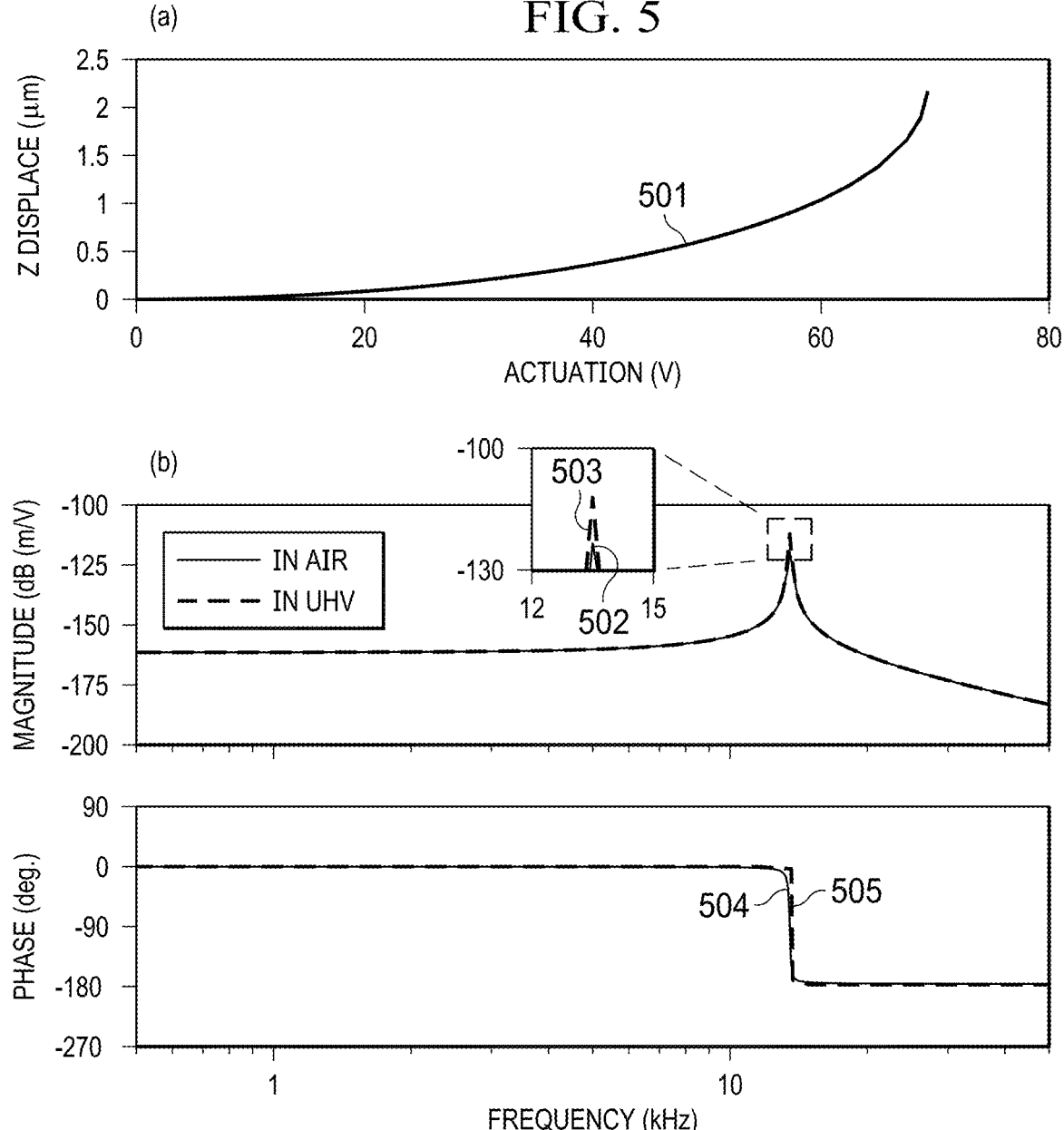
FIG. 5 is a set of graphs showing simulated displacement characteristics of a MEMS nanopositioner device for amplitude response and phase angle response as a function of driving frequency in both air and ultra-high vacuum in accordance with an illustrative embodiment.
Figure 6:
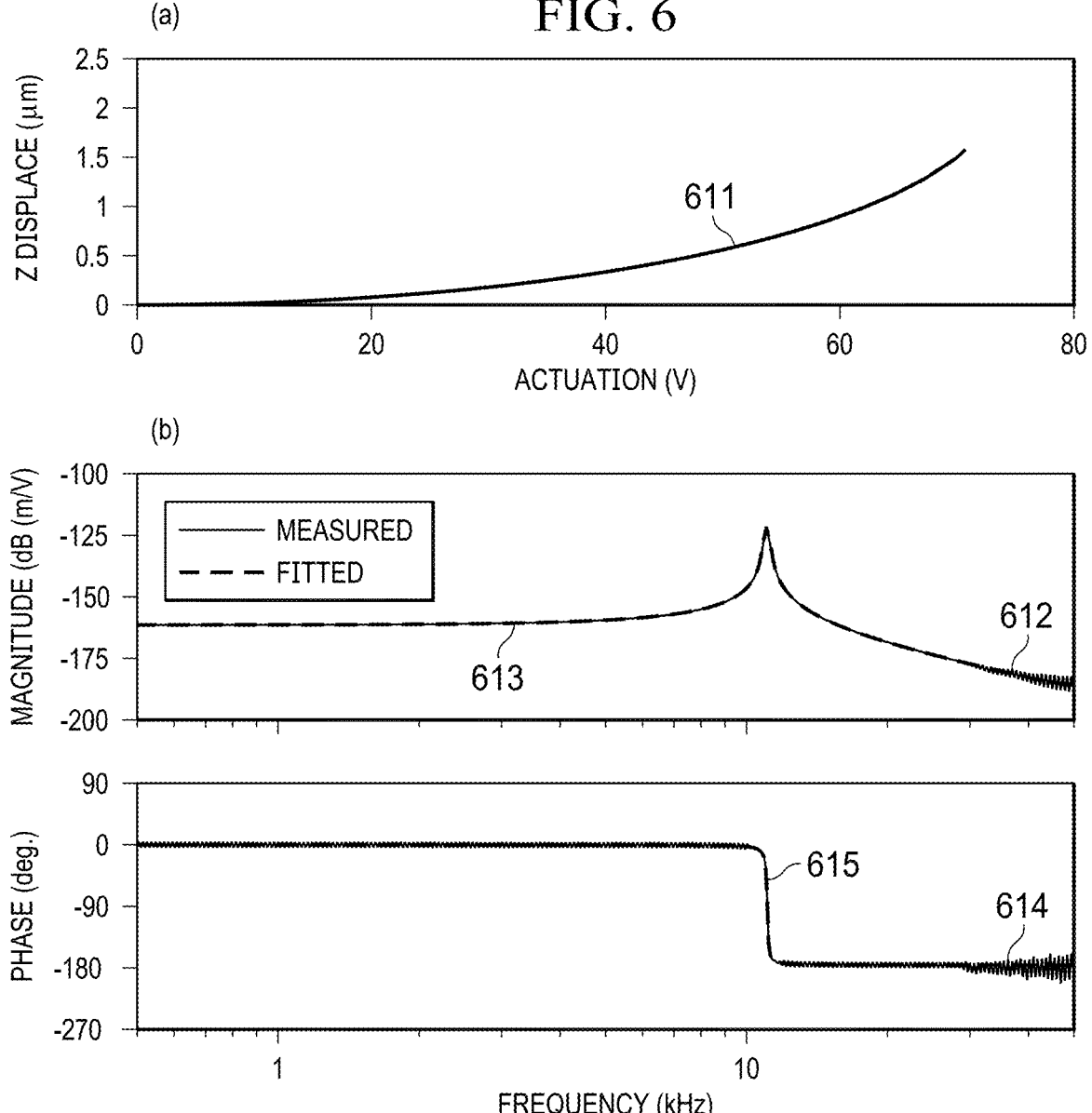
FIG. 6 is a set of graphs showing displacement amplitude response and phase angle response as a function of driving frequency of a MEMS nanopositioner device made in accordance with an illustrative embodiment.

In parallel-plate electrostatic actuators, the pull-in phenomena limits the maximum allowable displacement of the device. For an ideal parallel-plate electrostatic actuator, the pull-in instability occurs at one-third of the initial gap. However, fringing field effect originating from the limited geometry of the actuators contributes to this instability. In order to have an accurate estimation of the pull-in voltage, the static response of the device under electrostatic actuation is simulated and illustrated in plot 501 of FIG. 5. The result predicts that the shuttle beam displaces 2.2 μm in Z direction just before the pull-in instability occurs at 69.4V. Finally, because the Z-axis of the device is equipped with actuators, the resonance of the system along this axis needs to be obtained under electrostatic actuation force. The superposition of a DC voltage, i.e. 20V, and a small-amplitude AC signal is applied to the device actuators in various frequencies. Under assumption of squeezed film damping between actuator plates, the displacement response of the shuttle in Z direction is determined for each frequency and depicted in FIG. 5 which shows a graph 502, of the amplitude frequency response in air, a graph 503, of the amplitude frequency response in ultra high vacuum (UHV) conditions. Also shown in FIG. 5, is a graph 504, of the phase frequency response in air and a graph 505 of the phase frequency response in UHV conditions. Simulations show that resonance happens at 13.6 kHz with 40.2 dB dynamic range, which is typical of lightly damped behavior of MEMS devices. The resonance frequency obtained here is lower than the device's first natural frequency. This could be attributed to two causes: the softening effect of the applied DC voltage, and velocity damping effect. Since the majority of the STM systems work in UHV conditions, it is necessary to assess the UHV effect on the underdamped behavior of the MEMS nanopositioner device. We repeated the same simulation under UHV conditions with $10^{-10}$ Torr pressure, and included the result in FIG. 5. This simulation predicts that the dynamic range of the device increases by 11.8 dB in UHV conditions FIG. 6 shows measured displacement and frequency response characteristics corresponding to the simulations of FIG. 5.

Figure 10:
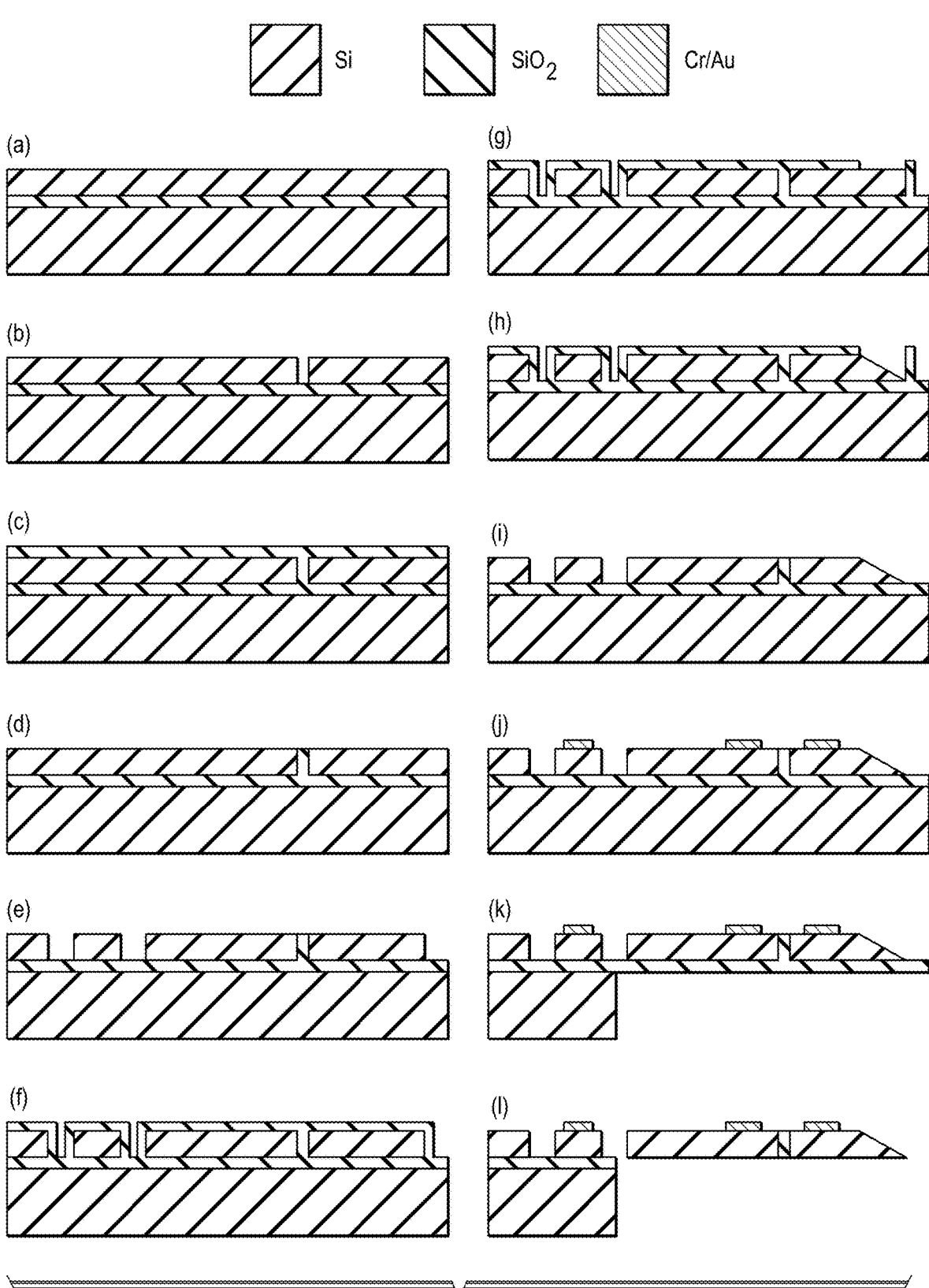
FIG. 10 is a set of schematic diagrams showing a microfabrication flow of a MEMS nanopositioner device in accordance with an illustrative embodiment.

FIGS. 7-9 show details of a microfabrication process for the MEMS nanopositioner device. FIG. 10 illustrates the fabrication process in a set of schematics while FIG. 11 provides SEM images of a representative device during the fabrication process.

FIGS. 7, 8 and 9 provide flow diagrams of the overall fabrication process 700, bridge fabrication process 800 and STM tip fabrication process 900, respectively. FIG. 8 should be considered a non-limiting embodiment of a bridge fabrication process for step 702 of process 700. FIG. 9 should be considered a non-limiting embodiment of an STM tip fabrication for step 704 of process 700.

FIG. 10 shows (a) initial SOI wafer, (b) bridge body formation, (c) thermal oxidation with subsequent LPCVD oxide deposition, (d) RIE of the oxide, (e) DRIE of the device layer, (f) sacrificial oxide layer deposition, (g) oxide opening formation with RIE, (h) wet etching of Si, (i) stripping the sacrificial oxide layer, (j) electrode deposition, (k) DRIE of the handle layer, and (l) releasing the device by RIE of the BOX layer.

Figure 11:
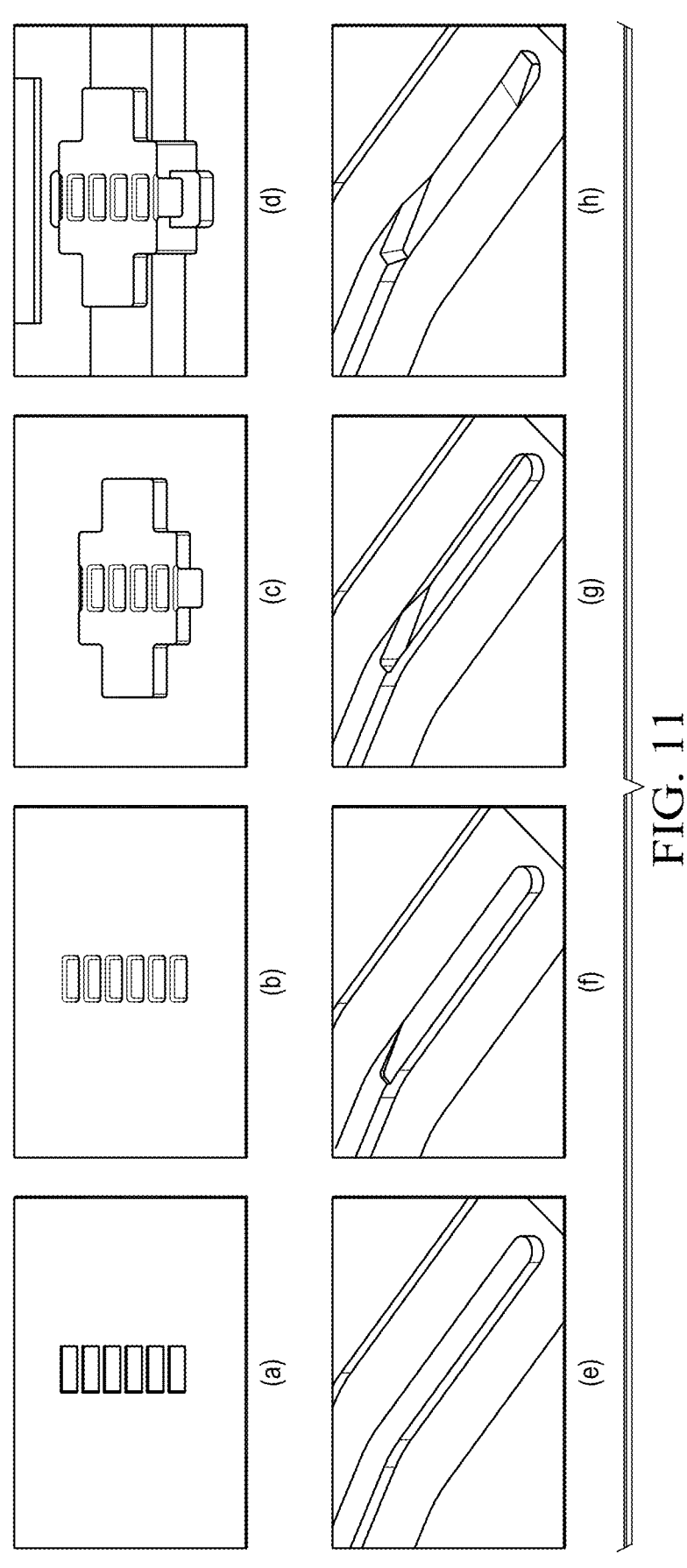
FIG. 11 is a set of SEM images of a MEMS nanopositioner device during the fabrication process in accordance with an illustrative embodiment.

FIG. 11 shows SEM images of (a) beams (b) oxidizing the beams (c) exposing the Si device layer (d) DRIE of the device layer (e) tip body (f) sacrificial LPCVD oxide defined as a wet etch mask (g) in-plane tip (h) stripping the sacrificial oxide layer. All scale bars are 40 μm in these images.

A highly doped SOI wafer (0.001-0.005 Ωcm, N-type, <100>) with a 20-μm device layer, 2-μm Buried-Oxide (BOX) layer, and 400-μm handle layer is chosen for the fabrication of the 1-DOF MEMS nanopositioner (step 701, illustrated in FIG. 10(*a*)). At step 702, the bridge fabrication process starts with defining the electrically isolating bridge geometry.

The bridge fabrication process 800, shown in the flow chart of FIG. 8, begins at step 801, wherein a set of beams are etched in the device layer by etching the device layer down to the BOX layer with the Deep Reactive Ion Etching (DRIE) process (See FIG. 10(*b*) and FIG. 11(*a*)). Typically, the beams are about 2 μm wide and about 20 μm long. Then, at step 802, the wafer undergoes a wet thermal oxidation step at 1100° C. to thoroughly oxidize the bridge (FIG. 11(*b*)). Step 802 consumes the whole of Si within the bridge structure and typically increases the beam width to about 4.4 μm. In order to reinforce the oxide bridge, a 0.8-μm oxide layer is conformally deposited all over the wafer, at step 803, using a low-pressure chemical vapor deposition (LPCVD) process (FIG. 10(*c*)) increasing the beam width to typically about 6 μm. Two patches of oxide (oxide patches 333 of FIG. 3) are intentionally left at either side of the oxide bridge to further strengthen oxide/Si interfaces 331 (FIG. 3). The oxide bridge fabrication is concluded, at step 804, by etching back the oxide on the device layer by Reactive Ion Etching (RIE) process to expose the Si layer again for the subsequent steps (FIG. 10(*d*) and FIG. 11(*c*)). In one embodiment, the initial Si layer thickness is selected to be 20 μm, reducing to 19 μm after completion of the oxide bridge fabrication.

Returning to the overall fabrication process 700, all other components of the MEMS nanopositioner, such as shuttle beam, actuators, flexures, and bonding pads (electrodes) are formed at the same time by patterning and etching the device layer with DRIE process (FIG. 10(*e*) and FIG. 11(*d*), step 703). At step 704, the STM tip fabrication process begins wherein the body of the STM tip is formed with the angle of θ with respect to the Si crystallographic <110> plane (FIG. 11(*e*)). In the non-limiting embodiments presented, the angle θ is selected to be 15°. In other embodiments, the angle θ may be chosen to be greater or less, between 6°-45°.

STM tip fabrication process 900 is further described in relation to FIG. 9. After the STM tip body is formed, step 901 is performed wherein a sacrificial 300-nm oxide layer is deposited with LPCVD process to conformally cover the STM tip body (FIG. 10(*f*)). Afterwards, at step 902, a window in the oxide layer is opened on top of the tip body with RIE process to define a mask for Si wet etch (FIG. 10(*g*) and FIG. 11(*f*)). Thanks to the sacrificial oxide layer, only the STM tip body is then anisotropically etched away, at step 903, in a Si etch solution (e.g., 45% KOH solution or a TMAH solution) to form the STM tip (FIG. 10(*h*) and FIG. 11(*g*)). The STM tip formation is concluded by etching away the sacrificial oxide layer (FIG. 10(*i*) and FIG. 11(*h*), step 904) with an oxide etch solution, for example, a buffered oxide etch solution or concentrated HF.

Returning to FIG. 7, the overall fabrication process 700 continues at step 705. In order to provide electrical signal routing and bonding pads, a stack of 20-nm Cr and 280-nm Au layers are deposited and the features patterned on the device with a lift-off process or dry etch process (FIG. 10(j), step 705). In the present embodiment, a sputtering process was used to deposit the metal layer and a lift-off process was used to pattern the bonding pads. In other embodiments, the metal layer deposition is not limited to Au and the process for deposition may be chosen from other methods known in the art such as evaporation.

Figure 12:
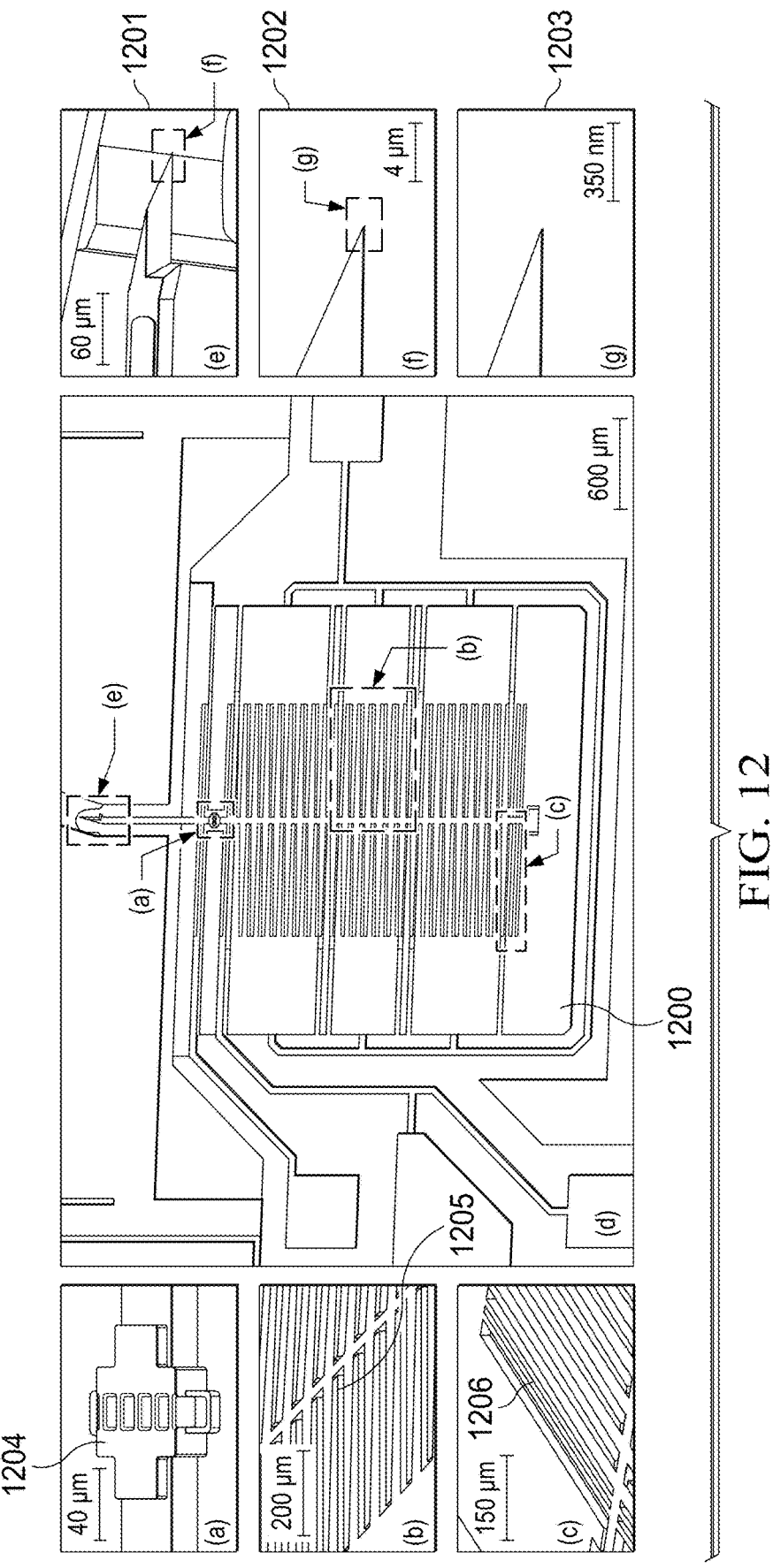
FIG. 12 is a set of SEM images of a MEMS nanopositioner device fabricated in accordance with an illustrative embodiment.

At the last steps of the fabrication, the handle layer is patterned and etched up to the BOX layer from the back side (FIG. 10(k), step 706). In the present embodiment, a DRIE process is used to remove the handle layer back to the BOX layer. In other embodiments, other processes may be used to remove the handle layer, for example, Si wet chemical etching. Then, at step 707, the BOX layer is etched away and the nanopositioner is released (FIG. 10(l)). In the present embodiment, a RIE process is used to etch away the BOX layer. Other processes, such as a vapor HF etch, may be used in other embodiments to etch the BOX layer. FIG. 12 shows the Scanning Electron Microscopy (SEM) images of a fabricated MEMS nanopositioner 1200, showing the STM tip at increasing levels of magnification in images 1201, 1202 and 1203. Fabricated MEMS nanopositioner includes an image of oxide bridge 1204, an image of the actuator arms 1205 and an image of compliant flexures 1206.

Important characteristics of the fabricated MEMS nanopositioner are empirically measured here in order to extract necessary parameters for the experiments. These properties include maximum achievable displacement, transfer function estimate for the first mode dynamics, and mode shapes of the device.

The actuation voltage-displacement trend of the device is experimentally observed to determine the required voltage levels for the desired stroke. During the experiments, a 4 Hz triangular signal is applied to the electrostatic actuators using a function generator cascaded with a voltage amplifier. Then, the displacement trend for the corresponding actuation voltage is simultaneously monitored using a Polytec MSA-100-3D Laser Doppler Vibrometer (LDV). The measurements are plotted in graph 611 of FIG. 6 and are similar to those reported for simulations in FIG. 5, which show that the shuttle beam displaces 1.6 μm when the actuation voltage is 70.2V. The discrepancy between predicted and measured displacements is due to the microfabrication tolerances and measurement errors.

Frequency response of the device from the input voltage (with 20-V DC offset) to the tip displacement is obtained by the LDV. Results show that the first resonant frequency of the device is located at 10.7 kHz. A second-order model is fitted to the frequency response to characterize the first mode dynamic response of the device:

$$G_m(s) = \frac{30.58}{s^2 + 655.4s + 4.552 \times 10^9}. \tag{4}$$

The measured and curve fitted amplitude frequency response are shown in graphs 612 and 613, respectively; the measured and curve fitted phase frequency response is shown in graphs 614 and 615, respectively. The lower resonance obtained empirically is due to microfabrication tolerances and the fact that the simulation did not allow for other sources of damping, such as internal damping of the material.

For mode shape measurements, the surface of the nanopositioner is scanned through the predefined points using the LDV, and the frequency response of the nanopositioner is obtained at each point in order to construct the mode shapes. The experimental mode shapes are in good agreement with the predicted ones reported in FIG. 4. While the first resonance is measured to be at 10.7 kHz, the higher out-of-plane resonances are beyond 14.1 kHz. The discrepancy in the predicted and measured values can be attributed to the microfabrication tolerances.

Figure 13:
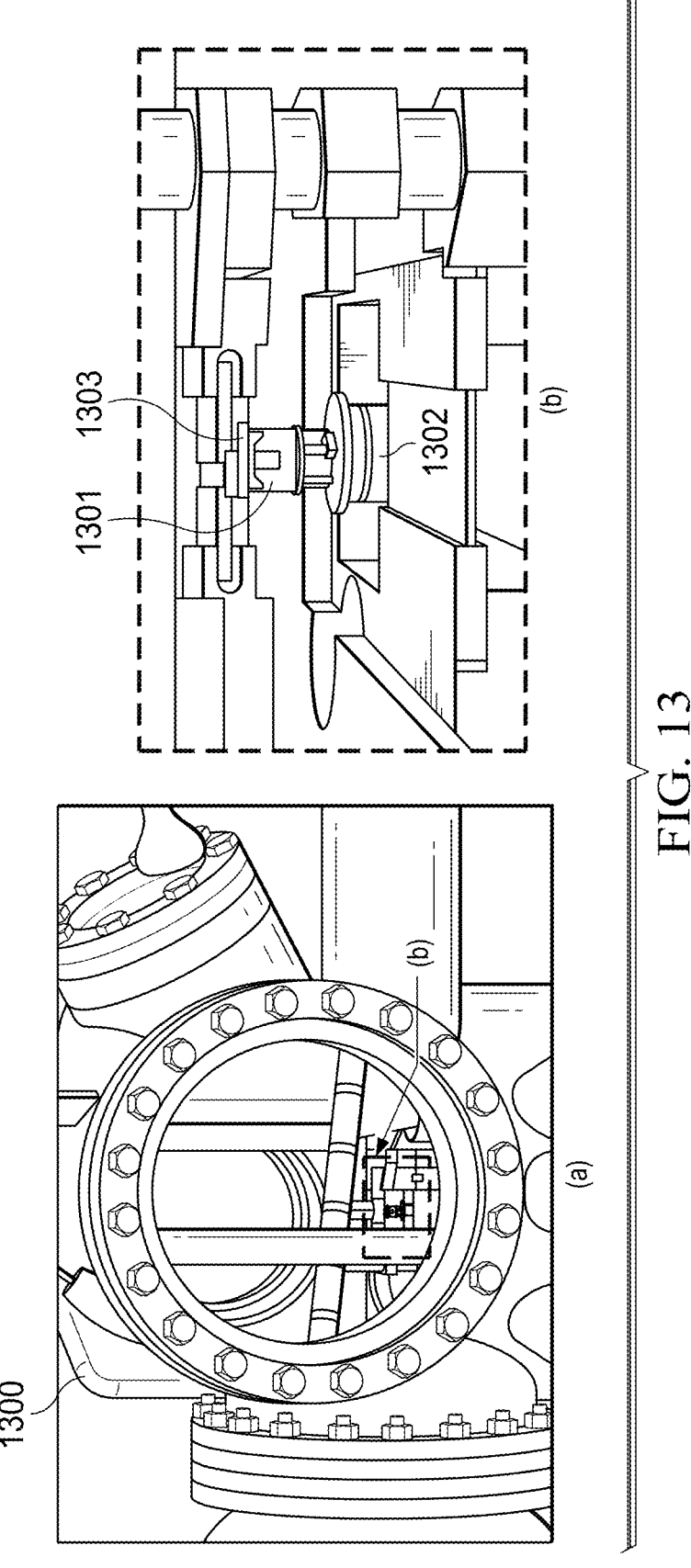
FIG. 13 is an image of an ultrahigh-vacuum chamber of a commercial scanning tunneling microscope configured with a MEMS nanopositioner device and a close up image of the MEMS nanopositioner device mounted onto the piezopositioner of the scanning tunneling microscope in accordance with an illustrative embodiment.

A commercial UHV STM system (Scienta Omicron UHV VT STM) is used as the testbed for the experiments. FIG. 13 shows the UHV chamber of such system with base pressure of $4 \times 10^{-11}$ Torr. As discussed above, the MEMS nanopositioner device 1301 is designed with dimensions compatible with the tip holder of the STM system. Conductive epoxy is used to affix the MEMS nanopositioner device onto the tip holder and connect the MEMS pads to the three signal pins of the tip holder (i.e. ground, actuation, and tunnel current) with gold wires. Afterwards, the MEMS assembly is transferred into the UHV chamber and mounted on the piezotube 1302, as shown in FIG. 10(b). The sample 1303 used in the experiment is H-passivated Si(100)-2×1 which is mounted upward down above the MEMS assembly. A rapid control prototyping unit (Zyvector, Zyvex Labs) running at 100-kHz sampling frequency is utilized to implement algorithms required for coarse positioning, establishing the tunneling current, feedback loop, imaging, and conducting lithography.

In order to prevent tip crash during a scan, a feedback loop is required to regulate the MEMS to maintain the tunneling current at a setpoint by rejecting disturbances. Here, the same controller for Z-axis of the original system's piezotube (i.e. proportional-integral) is used for the MEMS. However, in order to remove the quadratic nature of the MEMS electrostatic actuation, the square root of the control command is used in the feedback loop.

To construct a topography image, the control command is plotted against the XY-scanning pattern. For the STM based lithography, the sample surface is first imaged, and based on the image, the lattice is detected and mapped. Then, the STM tip is moved along a predefined trajectory with respect to the lattice, while the tunneling parameters are set to those required for lithography.

Figure 14:
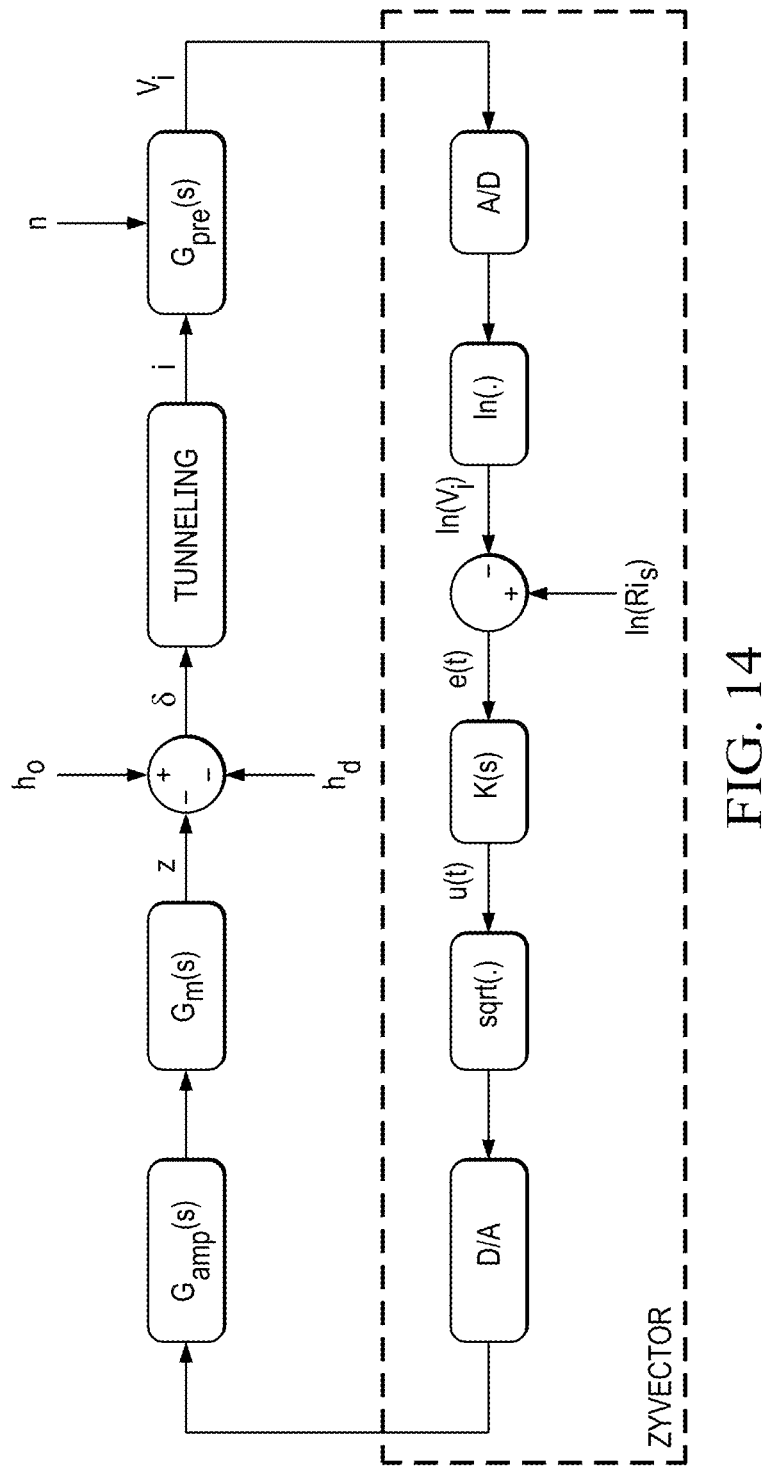
FIG. 14 is a block diagram of a Z-axis feedback loop of a scanning tunneling microscope system in accordance with an illustrative embodiment.

FIG. 14 illustrates a simplified block diagram detailing a suitable control feedback loop structure. The voltage amplifier, $G_{amp}(s)$, provides the required voltage for driving the MEMS nanopositioner, $G_m(s)$, changing the tip-sample gap, $\delta$, which is approximately equal to the barrier thickness:

$$\delta = h_0 - h_d - z, \tag{5}$$

where $h_0$ is the initial distance between the MEMS tip and sample, and $h_d$ accounts for the disturbances, e.g. drift. Here $\delta$ translates into a current, as follows:

$$i = \sigma V_b e^{-1.025\sqrt{\varphi}\delta}. \tag{6}$$

In this equation, $\sigma$ is a constant term that depends on the material properties of the tip and sample, whereas $V_b$ and $\varphi$ are the sample bias and barrier height, respectively. The preamplifier ($G_{pre}(s)$) converts the nano-ampere level current into a measurable voltage, $V_i$. In order to minimize the measurement noise (n), gain (R) of the preamplifier is typically set to 3V/nA. The $V_i$ signal is discretized by one of the Analog-to-Digital (A/D) converters available in Zyvector to be used in the control loop. As pointed out by Eq. 6, tunneling current is an exponential function of the tip-sample gap, and likewise of the MEMS motion. Therefore, it is necessary to take the natural logarithm of the signal to provide a linear dependency, as follows $$\ln(Ri) = \ln(R\sigma V_b) - 1.025\sqrt{\varphi}\,\delta. \qquad (7)$$

Here, $\ln(V_i)$ is compared with logarithm of the setpoint, and the resulting error signal is fed into the controller, K(s). Although the error signal is discrete, the control scheme can be described in continuous time domain due to the high sampling frequency. The controller here is a proportional integratal controller with the following equation:

$$K(s) = K_p + \frac{K_i}{s}, \qquad (8)$$

based on which the controller command, u(t), is determined. The square root of this signal is then taken to eliminate the quadratic dependency of z displacement on the applied voltage, as pointed out in Eq. 2. Finally, a Digital-to-Analog (D/A) converter in Zyvector converts the resulting discrete signal into an analog one to be used by the amplifier.

Figure 15:
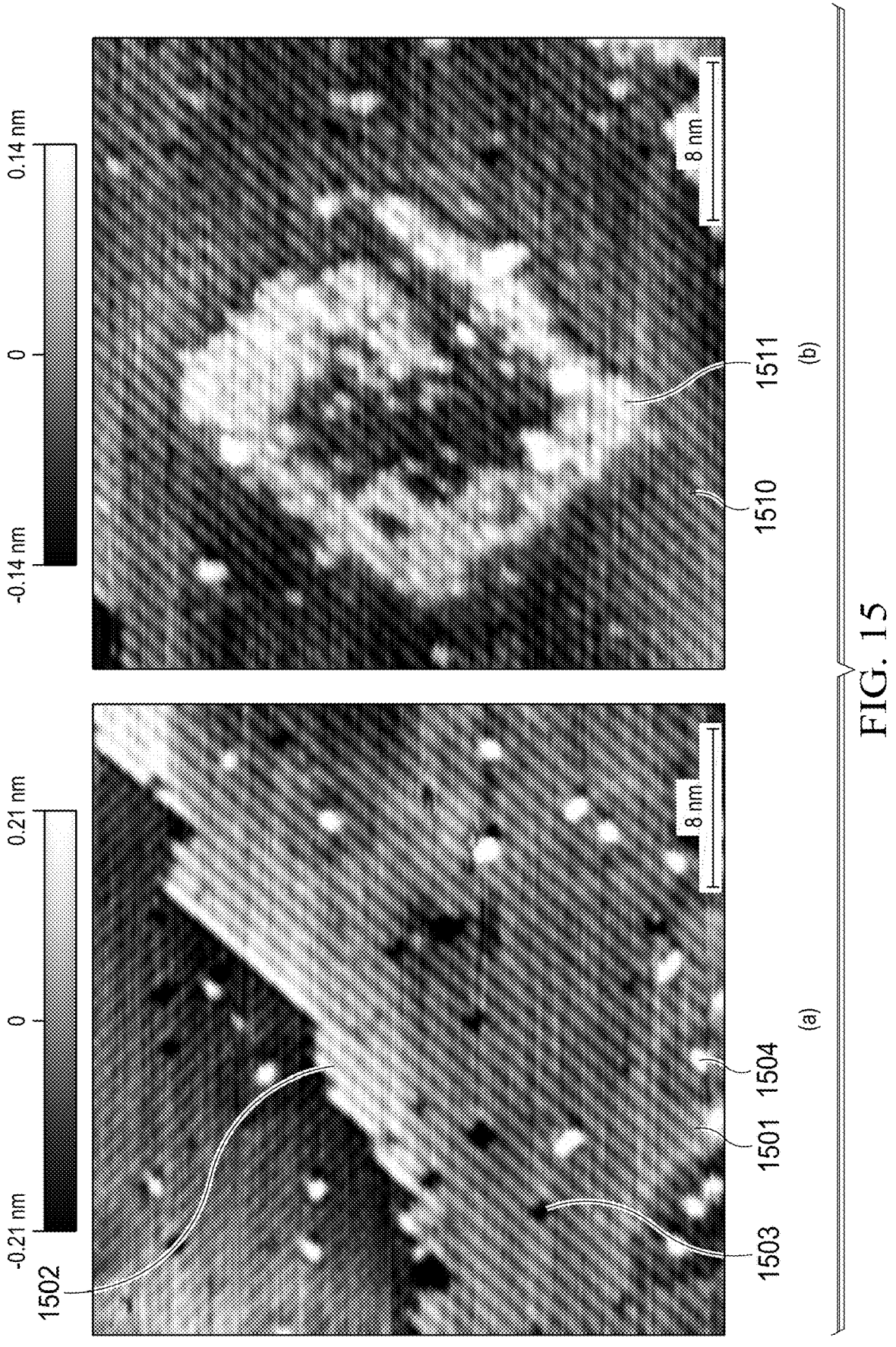
FIG. 15 is an STM image of experimental results showing imaging with a scanning tunneling microscope configured with a MEMS nanopositioner device in accordance with an illustrative embodiment.

FIG. 15 presents a typical atomic-resolution STM image 1501 obtained with the MEMS nanopositioner device of the present invention. For this image, the tunneling current and bias were set to 0.05 nA and −3 V, respectively. The image resolution was 512×256 pixels, and tip speed during the scan was 625 nm/s. Various surface features are distinguishable in this figure, such as step edge 1502, missing Si atoms 1503, and dangling bonds 1504. FIG. 15 is an STM image 1510 of the surface after conducting STM-based lithography with the MEMS nanopositioner device. The pattern defined here is a one-loop spiral. The tunneling current, bias, and dosage were set to 3 nA, 3.75 V, and 3 mC/cm for lithography, respectively. As shown in the figure, the MEMS nanopositioner device was able to create a lithography pattern 1511 with two-three dimer-row resolution.

The design, fabrication, and characterization of a new 1-DOF MEMS nanopositioner is disclosed that may replace the Z-axis of the conventional STM piezotubes and the STM tip. The device incorporates an integrated in-plane Si tip suitable for batch fabrication processes. In order to enable parallelism, a novel electrical isolation scheme is proposed and implemented to electrically isolate the tunneling signal. This allows current sensors to be put at the tip side. By integrating the device into the currently available STM systems, the Z-axis bandwidth can be increased beyond 10 kHz, while retaining the same ROM. The functionality of the device was demonstrated by integrating the MEMS nanopositioner device into a commercial UHV STM system and conducting experiments on a H-passivated Si(100)–2×1 sample in UHV conditions.

The approach of the illustrative embodiments offers a unique opportunity for parallelism in STM through the design of an integrated STM tip and a novel electrical isolation scheme. This ensures the uniformity of the STM tips throughout a single wafer.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for fabricating a MEMS nanopositioner, comprising:
   forming a highly doped SOI wafer with a device layer, a buried oxide (BOX) layer beneath the device layer, and a handle layer beneath the BOX layer;
   forming an actuation segment in the device layer, wherein the actuation segment comprises a number of electrostatic actuators interposed with a number of actuator fixtures;
   forming a tip segment including an STM tip in the device layer; and
   forming an oxide bridge in the device layer, wherein the oxide bridge mechanically connects the actuation segment to the tip segment and provides electrical isolation between the actuation segment and the tip segment, and wherein the tip segment, the actuation segment and the oxide bridge share the device layer of the SOI wafer.

2. The method of claim 1, further comprising:
   forming first and second electrodes on the MEMS nanopositioner, wherein the STM tip is electrically connected to the first electrode, and wherein the electrostatic actuators are electrically connected to the second electrode;
   patterning and etching the handle layer back to the BOX layer underneath the MEMS nanopositioner; and
   etching the BOX layer underneath a movable portion of the MEMS nanopositioner.

3. The method of claim 2, wherein forming the first and second electrodes comprises depositing one or more metal layers on the MEMS nanopositioner.

4. The method of claim 1, wherein forming the oxide bridge comprises:

etching the device layer down to the BOX layer to define the bridge;

oxidizing the bridge;

conformally depositing an oxide layer to reinforce the bridge; and etching back the oxide layer to expose the device layer except where the bridge was defined.

5. The method of claim 1, wherein forming the STM tip in the device layer further comprises forming a tip body with an angle of about 15 degrees with respect to a Si crystallographic plane.

6. The method of claim 1, wherein forming the STM tip in the device layer comprises:

depositing a sacrificial oxide layer to conformally cover a portion of the device layer;

creating an opening in the sacrificial oxide layer, the opening configured to form a mask for the STM tip;

etching the device layer under the opening to form the STM tip; and removing the sacrificial oxide layer.

7. The method of claim 1, wherein the highly doped SOI wafer consists of the device layer of about 20 μm thickness, the BOX layer of about 2-μm thickness, and the handle layer of about 400-μm thickness.

8. The method of claim 2, wherein the electrical connections between the STM tip and the first electrode and the electrical connections between the actuation segment and the second electrode share the device layer of the SOI wafer.

9. A method for fabricating a MEMS nanopositioner, comprising:

forming a highly doped SOI wafer with a device layer, a buried oxide (BOX) layer beneath the device layer, and a handle layer beneath the BOX layer;

forming an actuation segment in the device layer, wherein the actuation segment comprises a number of electrostatic actuators interposed with a number of actuator fixtures;

forming a tip segment including an STM tip in the device layer;

forming first and second electrodes on the MEMS nanopositioner, wherein the STM tip is electrically connected to the first electrode and the electrostatic actuators are electrically connected to the second electrode; and forming an oxide bridge in the device layer, wherein the oxide bridge mechanically connects the actuation segment to the tip segment and provides electrical isolation between the actuation segment and the tip segment, and wherein the tip segment, the actuation segment and the oxide bridge share the device layer of the SOI wafer.

10. The method of claim 9, further comprising:

patterning and etching the handle layer back to the BOX layer underneath the MEMS nanopositioner; and etching the BOX layer underneath a movable portion of the MEMS nanopositioner.

11. The method of claim 9, wherein forming the first and second electrodes comprises depositing one or more metal layers on the MEMS nanopositioner.

12. The method of claim 9, wherein forming the oxide bridge comprises:

etching the device layer down to the BOX layer to define the bridge;

oxidizing the bridge;

conformally depositing an oxide layer to reinforce the bridge; and etching back the oxide layer to expose the device layer except where the bridge was defined.

13. The method of claim 9, wherein the highly doped SOI wafer consists of the device layer of about 20 μm thickness, the BOX layer of about 2-μm thickness, and the handle layer of about 400-μm thickness.

14. A method for fabricating a MEMS nanopositioner, comprising:

forming a highly doped SOI wafer with a device layer, a buried oxide (BOX) layer beneath the device layer, and a handle layer beneath the BOX layer;

forming an actuation segment in the device layer, wherein the actuation segment comprises a number of electrostatic actuators interposed with a number of actuator fixtures;

forming a tip segment including an STM tip in the device layer;

forming first and second electrodes on the MEMS nanopositioner, wherein the STM tip is electrically connected to the first electrode the electrostatic actuators are electrically connected to the second electrode;

forming an oxide bridge in the device layer, wherein the oxide bridge mechanically connects the actuation segment to the tip segment and provides electrical isolation between the actuation segment and the tip segment, and wherein the tip segment, the actuation segment and the oxide bridge share the device layer of the SOI wafer;

patterning and etching the handle layer back to the BOX layer underneath the MEMS nanopositioner; and etching the BOX layer underneath a movable portion of the MEMS nanopositioner.

15. The method of claim 14, wherein forming the oxide bridge comprises:

etching the device layer down to the BOX layer to define the bridge;

oxidizing the bridge;

conformally depositing an oxide layer to reinforce the bridge; and etching back the oxide layer to expose the device layer except where the bridge was defined.

16. The method of claim 14, wherein forming the STM tip in the device layer comprises:

depositing a sacrificial oxide layer to conformally cover a portion of the device layer;

creating an opening in the sacrificial oxide layer, the opening configured to form a mask for the STM tip;

etching the device layer under the opening to form the STM tip; and removing the sacrificial oxide layer.

17. The method of claim 14, wherein the highly doped SOI wafer consists of the device layer of about 20 μm thickness, the BOX layer of about 2-μm thickness, and the handle layer of about 400-μm thickness.

* * * * *